US012607877B2

(12) United States Patent
Lin et al.

(10) Patent No.: US 12,607,877 B2
(45) Date of Patent: Apr. 21, 2026

(54) CONTACT LENS PRODUCT

(71) Applicant: LARGAN MEDICAL CO., LTD.,
Taichung City (TW)

(72) Inventors: En-Ping Lin, Taichung City (TW);
Wei-Yuan Chen, Taichung City (TW);
Chun-Hung Teng, Taichung City (TW)

(73) Assignee: LARGAN MEDICAL CO., LTD.,
Taichung City (TW)

( * ) Notice: Subject to any disclaimer, the term of this
patent is extended or adjusted under 35
U.S.C. 154(b) by 626 days.

(21) Appl. No.: 17/822,818

(22) Filed: Aug. 29, 2022

(65) Prior Publication Data

US 2023/0004022 A1      Jan. 5, 2023

Related U.S. Application Data

(63) Continuation of application No. 16/984,301, filed on
Aug. 4, 2020, now Pat. No. 11,467,425, which is a
continuation of application No. 16/528,775, filed on
Aug. 1, 2019, now Pat. No. 10,768,445, which is a
continuation of application No. 15/251,007, filed on
Aug. 30, 2016, now Pat. No. 10,416,476.

(30) Foreign Application Priority Data

Sep. 15, 2015   (TW) ................................. 104130460
Oct. 29, 2015   (TW) ................................. 104135628

(51) Int. Cl.
*G02C 7/04*            (2006.01)
(52) U.S. Cl.
CPC .............. *G02C 7/049* (2013.01); *G02C 7/04*
(2013.01); *G02C 7/041* (2013.01); *G02C*
*7/042* (2013.01); *G02C 7/044* (2013.01);

*G02C 2202/06* (2013.01); *G02C 2202/22*
(2013.01); *G02C 2202/24* (2013.01)
(58) Field of Classification Search
CPC .......... G02C 7/049; G02C 7/04; G02C 7/041;
G02C 7/042; G02C 7/044; G02C
2202/06; G02C 2202/22; G02C 2202/24;
A61F 9/0017
See application file for complete search history.

(56) References Cited

U.S. PATENT DOCUMENTS

| | | | |
|---|---|---|---|
| 6,045,578 A | 4/2000 | Collins et al. |
| 6,210,005 B1 | 4/2001 | Portney |
| 7,165,840 B2 | 1/2007 | Yokoyama et al. |
| (Continued) | | |

FOREIGN PATENT DOCUMENTS

| | | |
|---|---|---|
| CN | 102382237 A | 3/2012 |
| CN | 103389586 A | 11/2013 |
| (Continued) | | |

*Primary Examiner* — Bumsuk Won
*Assistant Examiner* — Ray Alexander Dean
(74) *Attorney, Agent, or Firm* — McClure, Qualey &
Rodack, LLP

(57) ABSTRACT

A contact lens product includes a multifocal contact lens and
a buffer solution. The multifocal contact lens includes a
central region and at least one annular region. The annular
region concentrically surrounds the central region. A diopter
of the annular region is different from a diopter of the central
region. The multifocal contact lens is immersed in the buffer
solution, and the buffer solution includes a cycloplegic
agent.

11 Claims, 21 Drawing Sheets

(56)  References Cited

U.S. PATENT DOCUMENTS

| | | | |
|---|---|---|---|
| 8,360,576 B2 | 1/2013 | Pearson et al. | |
| 8,672,474 B2 | 3/2014 | Lindacher et al. | |
| 8,783,863 B2 | 7/2014 | Wang | |
| 8,998,408 B2 | 4/2015 | Wei et al. | |
| 9,477,097 B2 | 10/2016 | Holden et al. | |
| 9,827,250 B2 | 11/2017 | Chehab et al. | |
| 9,987,808 B2 | 6/2018 | Archer et al. | |
| 10,371,965 B2 | 8/2019 | Lee et al. | |
| 10,416,476 B2 | 9/2019 | Lin et al. | |
| 2005/0074497 A1 | 4/2005 | Schultz | |
| 2005/0105047 A1 | 5/2005 | Smith et al. | |
| 2005/0254003 A1 | 11/2005 | Jani et al. | |
| 2007/0115431 A1 | 5/2007 | Smith et al. | |
| 2007/0126982 A1 | 6/2007 | Myung et al. | |
| 2007/0159594 A9 | 7/2007 | Jani et al. | |
| 2007/0222942 A1 | 9/2007 | Wooley et al. | |
| 2007/0296916 A1 | 12/2007 | Holden et al. | |
| 2008/0062380 A1 | 3/2008 | Phillips | |
| 2008/0218687 A1 | 9/2008 | Phillips | |
| 2008/0291393 A1 | 11/2008 | Menezes | |
| 2009/0141235 A1 | 6/2009 | Collins et al. | |
| 2009/0161065 A1 | 6/2009 | Leo et al. | |
| 2009/0303434 A1 | 12/2009 | Tung | |
| 2009/0303442 A1 | 12/2009 | Choo et al. | |
| 2010/0036489 A1 | 2/2010 | Lindacher et al. | |
| 2010/0073629 A1 | 3/2010 | Menezes | |
| 2010/0195044 A1 | 8/2010 | Collins et al. | |
| 2010/0296058 A1 | 11/2010 | Ho et al. | |
| 2010/0328604 A1 | 12/2010 | Collins et al. | |
| 2011/0001923 A1 | 1/2011 | Phillips | |
| 2011/0051079 A1 | 3/2011 | Martinez et al. | |
| 2011/0063567 A1 | 3/2011 | Domschke et al. | |
| 2011/0153012 A1 | 6/2011 | Legerton et al. | |
| 2012/0008217 A1* | 1/2012 | Ishak | A61K 8/58 |
| | | | 359/722 |
| 2012/0113386 A1 | 5/2012 | Back | |
| 2012/0176582 A1 | 7/2012 | Back et al. | |
| 2012/0194780 A1 | 8/2012 | Back | |
| 2012/0320333 A1 | 12/2012 | Holden et al. | |
| 2013/0010255 A1 | 1/2013 | Holden et al. | |
| 2013/0109779 A1 | 5/2013 | Argal et al. | |
| 2013/0182215 A1 | 7/2013 | Tung | |
| 2013/0182216 A1 | 7/2013 | Ho et al. | |
| 2013/0293834 A1 | 11/2013 | Wang | |
| 2013/0314665 A1 | 11/2013 | Tung | |
| 2014/0036225 A1 | 2/2014 | Chehab et al. | |
| 2014/0132914 A1 | 5/2014 | Holden et al. | |
| 2014/0132933 A1 | 5/2014 | Martinez et al. | |
| 2014/0211147 A1* | 7/2014 | Wei | G02C 7/06 |
| | | | 351/159.79 |
| 2014/0320800 A1 | 10/2014 | Collins et al. | |
| 2014/0347622 A1 | 11/2014 | Wu | |
| 2015/0085247 A1 | 3/2015 | Holden et al. | |
| 2015/0124212 A1 | 5/2015 | Loertscher et al. | |
| 2015/0124213 A1 | 5/2015 | Collins et al. | |
| 2016/0000314 A1 | 1/2016 | Drobe | |
| 2016/0054588 A1 | 2/2016 | Brennan et al. | |
| 2016/0062144 A1 | 3/2016 | Brennan et al. | |
| 2016/0320634 A1 | 11/2016 | Ho et al. | |
| 2017/0010478 A1 | 1/2017 | Holden et al. | |
| 2017/0038603 A1 | 2/2017 | Holden et al. | |
| 2017/0052390 A1 | 2/2017 | Tung | |
| 2017/0146821 A9 | 5/2017 | Collins et al. | |
| 2017/0146824 A1 | 5/2017 | Martinez et al. | |
| 2017/0168320 A1 | 6/2017 | Tsubota et al. | |
| 2017/0184875 A1 | 6/2017 | Newman | |
| 2017/0192252 A1 | 7/2017 | Brennan et al. | |

FOREIGN PATENT DOCUMENTS

| | | | | |
|---|---|---|---|---|
| CN | 103576337 A | 2/2014 | | |
| EP | 0742464 A2 | 11/1996 | | |
| EP | 2693259 A1 * | 2/2014 | | A61P 27/02 |
| EP | 3144720 A2 | 3/2017 | | |
| JP | H06206820 A | 7/1994 | | |
| JP | H0926559 A | 1/1997 | | |
| JP | 2009540373 A | 11/2009 | | |
| JP | 2012526302 A | 10/2012 | | |
| JP | 2014032404 A | 2/2014 | | |
| JP | 2015102870 A | 6/2015 | | |
| JP | 2017058668 A | 3/2017 | | |
| TW | 201237502 | 9/2012 | | |
| TW | 201237502 A | 9/2012 | | |
| TW | 201242942 A | 11/2012 | | |
| TW | 201243427 A | 11/2012 | | |
| TW | 201410265 A | 3/2014 | | |
| TW | 201447419 A | 12/2014 | | |
| WO | 2005016617 A1 | 2/2005 | | |
| WO | 2007146673 A2 | 12/2007 | | |
| WO | 2011045376 A1 | 4/2011 | | |
| WO | 2014177871 A1 | 11/2014 | | |

* cited by examiner

100

210

310

311

314

313

312

DiC

DiP3

DiP2

DiP1

CONTACT LENS PRODUCT

RELATED APPLICATIONS

The present application is a Continuation of U.S. application Ser. No. 16/984,301, filed on Aug. 4, 2020, which is a continuation of the application Ser. No. 16/528,775, filed on Aug. 1, 2019, U.S. Pat. No. 10,768,445 issued on Sep. 8, 2020, which is a continuation of the application Ser. No. 15/251,007, filed on Aug. 30, 2016, U.S. Pat. No. 10,416, 476 issued on Sep. 17, 2019, which claims priority to Taiwan Application Serial Number 104130460, filed Sep. 15, 2015, and Taiwan Application Serial Number 104135628, filed Oct. 29, 2015, which are incorporated by reference herein in its entirety.

BACKGROUND

Technical Field

The present disclosure relates to a contact lens product. More particularly, the present disclosure relates to a contact lens product which can prevent myopia or control a progression of myopia.

Description of Related Art

According to the data of World Health Organization (WHO), the prevalence of myopia in all world countries is between 8% and 62%. However, surveys show that the prevalence of myopia in teenagers and children under 18 years old in Taiwan is up to 85%, which is significantly beyond other countries. One reason is probably due to the highly developed 3 C electronic devices in recent years, which results in improper stimuluses and overuse of eyes of young children prematurely. Current researches show that once young children suffer early-onset myopia, the degree of myopia will increase with a certain speed. Current researches further show that the lower the age at which the myopia occurs is, the higher probability of becoming high myopia (greater than or equal to 6.0 D) will be. A person suffering high myopia is more likely to further suffer serious complications, such as retinal detachment and glaucoma. Therefore, if a controlling or moderating method can be conducted when the pseudomyopia is observed in the young children, the pseudomyopia can be effectively prevented from becoming myopia, and the high myopia can be further prevented.

The main cause of myopia is a variation of the optical structure of eyeballs. The optical image is mainly affected by the factors, such as cornea, lens and the length of the eyeballs. As for a normal person, lights can be precisely focused on the retina thereof so as to obtain a clearly image. However, as for a person suffering myopia, lights are focused in front of the retina thereof due to an excessive diopter (refractive myopia) or an excessive axial length of the eyeball (axial myopia), so that a blurred image is obtained. Symptoms of myopia of young children can be divided into myopia and pseudomyopia, wherein the myopia occurs due to an excessive axial length of the eyeball and cannot be corrected. However, the pseudomyopia is a temporary symptom caused by excessive tension of ciliary muscle and can be corrected. Clinically, there are many methods for correcting children pseudomyopia. The main methods include wearing orthokeratology and applying long-acting mydriatics. However, the orthokeratology may result in a highly external pressure which makes the wearer uncomfortable. When applying the long-acting mydriatics alone, a higher concentration dose is usually required. Accordingly, the probability of drug side effects is enhanced, too.

SUMMARY

According to one aspect of the present disclosure, a contact lens product includes a multifocal contact lens and a buffer solution. The multifocal contact lens is immersed in the buffer solution. The multifocal contact lens includes a central region and at least one annular region. The annular region concentrically surrounds the central region, wherein a diopter of the annular region is different from a diopter of the central region. The buffer solution includes a cycloplegic agent. When a weight percentage concentration of the cycloplegic agent in the buffer solution is ConA, the following condition is satisfied:

$$0 < ConA \leq 1\%.$$

According to another aspect of the present disclosure, a contact lens product includes a multifocal contact lens. A composition for manufacturing the multifocal contact lens includes a blue-light blocking agent.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
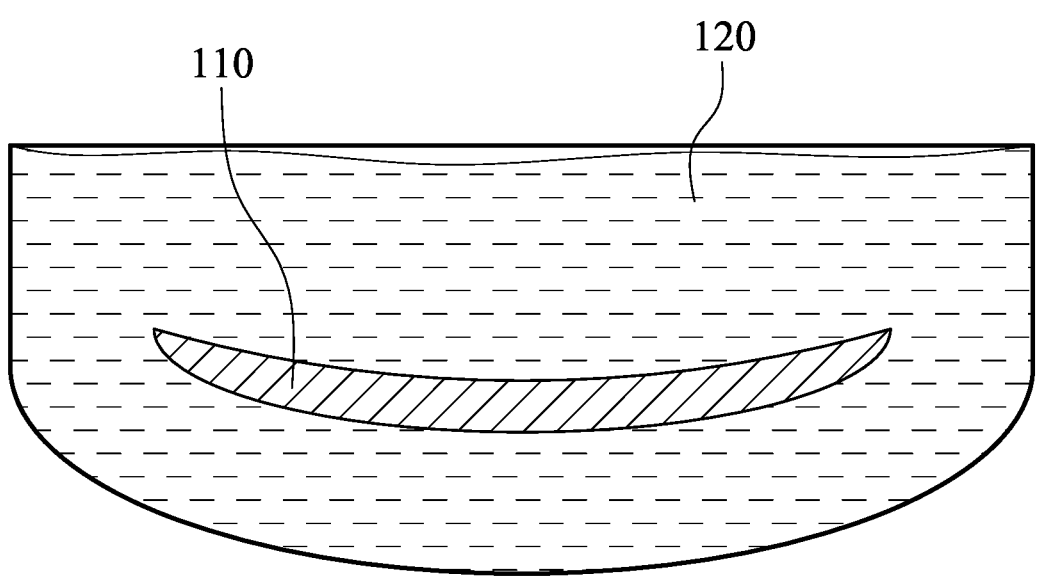
FIG. 1 is a schematic view of a contact lens product according to one embodiment of the present disclosure.

FIG. 1 is a schematic view of a contact lens product 100 according to one embodiment of the present disclosure. The contact lens product 100 includes a multifocal contact lens 110 and a buffer solution 120. The multifocal contact lens 110 is immersed in the buffer solution 120.

Figure 2:
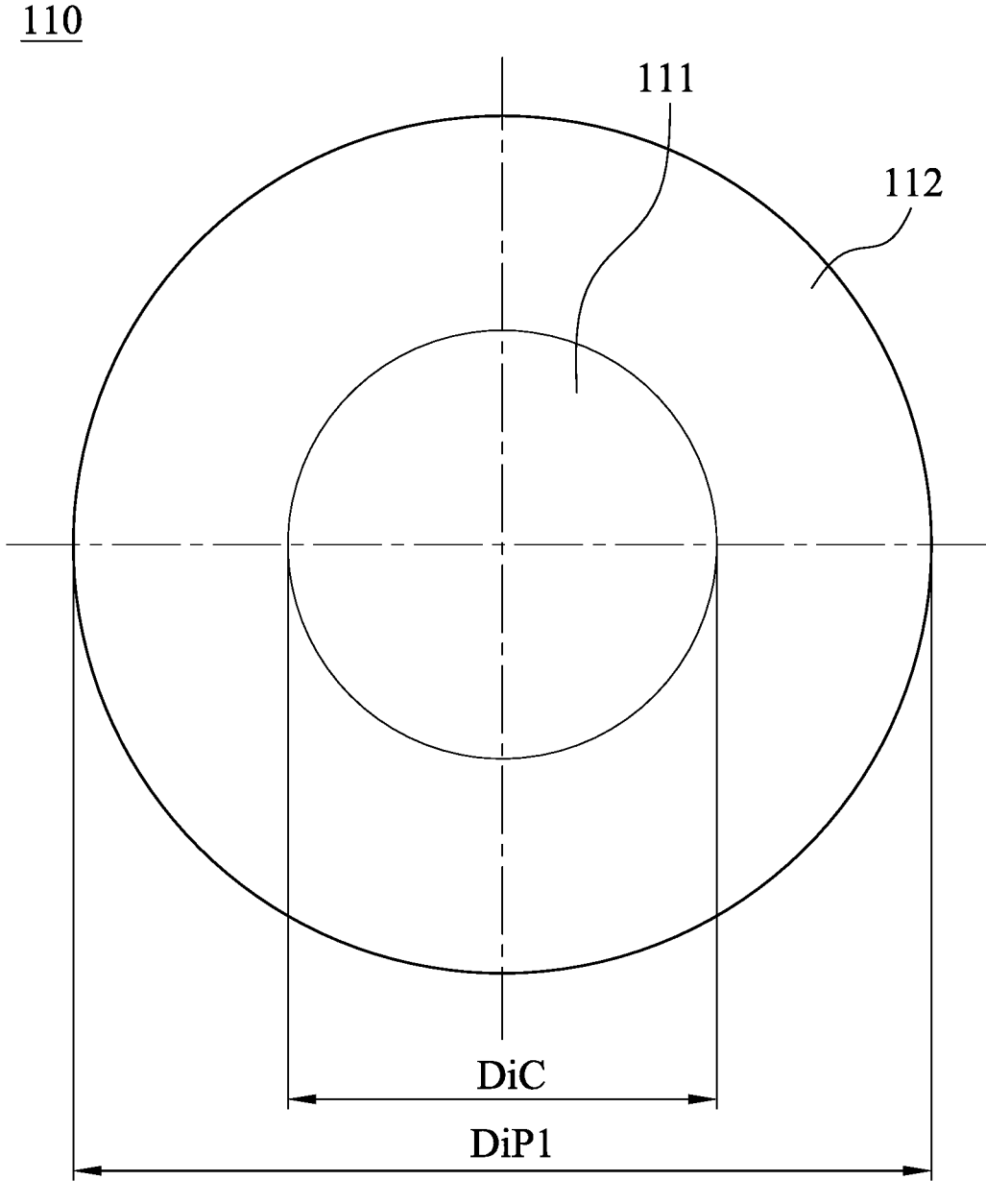
FIG. 2 is a schematic plan view of a multifocal contact lens in FIG. 1.

FIG. 2 is a schematic plan view of the multifocal contact lens 110 in FIG. 1. The multifocal contact lens 110 includes a central region 111 and a first annular region 112. The first annular region 112 concentrically surrounds the central region 111. A diopter of the first annular region 112 is different from a diopter of the central region 111. Therefore, the multifocal contact lens 110 is featured with multi-focus function, the peripheral image can be formed in front of the retina, which can moderate the increase of the axial length of the eyeball, and the exacerbation of myopia can be prevented. According to one example of the present disclosure, the diopter of the central region 111 is fixed.

At least one of the central region 111 and the first annular region 112 of the multifocal contact lens 110 is aspheric. Therefore, it is favorable to design the first annular region 112 with a gradient diopter.

Referring back to FIG. 1, the buffer solution 120 includes a cycloplegic agent. When a weight percentage concentration of the cycloplegic agent in the buffer solution 120 is ConA, the following condition is satisfied: $0 < \text{ConA} \leq 1\%$. Therefore, the concentration of the cycloplegic agent is proper, which is favorable to relax the ciliary muscle and reduce the probability of drug side effects. Alternatively, the following condition can be satisfied: $0 < \text{ConA} \leq 0.5\%$. Alternatively, the following condition can be satisfied: $0 < \text{ConA} \leq 0.25\%$. Alternatively, the following condition can be satisfied: $0 < \text{ConA} \leq 0.1\%$. Alternatively, the following condition can be satisfied: $0 < \text{ConA} \leq 0.05\%$. Alternatively, the following condition can be satisfied: $0 < \text{ConA} \leq 0.01\%$. The buffer solution 120 can be prepared by providing a basic solution, wherein the basic solution can be a commercially available solution for immersing and preserving contact lenses. Then the cycloplegic agent is added into the basic solution to a required concentration, wherein chemical reactions do not occur between the basic solution and the cycloplegic agent.

According to the aforementioned contact lens product 100, a composition for manufacturing the multifocal contact lens 110 can include a blue-light blocking agent. Therefore, the multifocal contact lens 110 can block high-energy blue lights, and the probability that the retina hurt by the blue lights can be reduced. According to one example of the present disclosure, the blue-light blocking agent can be 4-(phenyldiazenyl) phenyl methacrylate.

According to the aforementioned contact lens product 100, the composition for manufacturing the multifocal contact lens 110 can include a UV (Ultraviolet) blocking agent. The UV blocking agent can be but is limited to 2-[3-(2H-benzotriazol-2-yl)-4-hydroxyphenyl]ethyl methacrylate, 4-methacryloxy-2-hydroxybenzophenone, 2-phenylethyl acrylate, 2-phenylethyl methacrylate, 2-(2'-hydroxy-5'-methacryloxyethylphenyl)-2H-benzotriazole or 2-(4-benzoyl-3-hydroxyphenoxy)ethyl acrylate. Therefore, the multifocal contact lens 110 can block high-energy UV lights, and the probability that the retina hurt by the UV lights can be reduced. According to one example of the present disclosure, the UV blocking agent can be 2-(2'-hydroxy-5'-methacryloxyethylphenyl)-2H-benzotriazole. According to another example of the present disclosure, the UV blocking agent can be 2-(4-benzoyl-3-hydroxyphenoxy)ethyl acrylate. The aforementioned UV blocking agents can be used simultaneously or separately.

According to the aforementioned contact lens product 100, the multifocal contact lens 110 can be made of silicone hydrogel. Therefore, the oxygen permeability of the multifocal contact lens 110 can be enhanced, and the phenomena, such as red eyes, bloodshot eyes and swell, caused by the hypoxia of cornea can be prevented. Accordingly, the long wear comfort can be provided. The silicone hydrogel can be but is not limited to the contact lens material classified as Group V by U.S. FDA (U.S. Food and Drug Administration), such as Balafilcon A, Comfilcon A, Efrofilcon A, Enfilcon A, Galyfilcon A, Lotrafilcon A, Lotrafilcon B, Narafilcon A, Narafilcon B, Senofilcon A, Delefilcon A and Somofilcon A.

The composition for manufacturing the silicone hydrogel can include 2-hydroxyethyl methacrylate, 3-methacryloyloxypropyltris(trimethylsilyloxy)silane, 2-hydroxy-2-methyl-propiophenone, N-vinyl-2-pyrrolidinone, N,N-dimethyl acrylamide, ethylene glycol dimethacrylate, 3-(3-methacryloxy-2-hydroxypropoxy)propylbis(trimethylsiloxy)methylsilane, isopropyl alcohol and methacrylic acid.

Preferably, a weight percentage concentration of the ingredients of the composition for manufacturing the silicone hydrogel can be as follows. The weight percentage concentration of the 2-hydroxyethyl methacrylate is 0.05% to 25%, the weight percentage concentration of the 3-methacryloyloxypropyltris(trimethylsilyloxy)silane is 0.1% to 40%, the weight percentage concentration of the 2-hydroxy-2-methyl-propiophenone is 0.01% to 5%, the weight percentage concentration of the N-vinyl-2-pyrrolidinone is 0.1% to 35%, the weight percentage concentration of the N,N-dimethyl acrylamide is 0.1% to 40%, the weight percentage concentration of the ethylene glycol dimethacrylate is 0.01% to 5%, the weight percentage concentration of the 3-(3-methacryloxy-2-hydroxypropoxy)propylbis(trimethylsiloxy)methylsilane is 0.1% to 30%, the weight percentage concentration of the isopropyl alcohol is 0.1% to 30%, and the weight percentage concentration of the methacrylic acid is 0.01% to 5%.

More preferably, the weight percentage concentration of the ingredients of the composition for manufacturing the silicone hydrogel can be as follows. The weight percentage concentration of the 2-hydroxyethyl methacrylate is 0.1% to 10%, the weight percentage concentration of the 3-methacryloyloxypropyltris(trimethylsilyloxy)silane is 1% to 40%, the weight percentage concentration of the 2-hydroxy- 2-methyl-propiophenone is 0.1% to 2%, the weight percentage concentration of the N-vinyl-2-pyrrolidinone is 1% to 35%, the weight percentage concentration of the N,N-dimethyl acrylamide is 1% to 20%, the weight percentage concentration of the ethylene glycol dimethacrylate is 0.1% to 2%, the weight percentage concentration of the 3-(3-methacryloxy-2-hydroxypropoxy)propylbis(trimethylsiloxy)methylsilane is 1% to 30%, the weight percentage concentration of the isopropyl alcohol is 1% to 20%, and the weight percentage concentration of the methacrylic acid is 0.1% to 2%.

The composition for manufacturing the silicone hydrogel can include 2-hydroxyethyl methacrylate, 3-methacryloyloxypropyltris(trimethylsilyloxy)silane, 2-hydroxy-2-methyl-propiophenone, N-vinyl-2-pyrrolidinone, N,N-dimethyl acrylamide, ethylene glycol dimethacrylate, (3-acryloxy-2-hydroxypropoxypropyl)terminated polydimethylsiloxane and 1-hexanol.

Preferably, a weight percentage concentration of the ingredients of the composition for manufacturing the silicone hydrogel can be as follows. The weight percentage concentration of the 2-hydroxyethyl methacrylate is 0.05% to 25%, the weight percentage concentration of the 3-methacryloyloxypropyltris(trimethylsilyloxy)silane is 0.1% to 40%, the weight percentage concentration of the 2-hydroxy-2-methyl-propiophenone is 0.01% to 5%, the weight percentage concentration of the N-vinyl-2-pyrrolidinone is 0.1% to 35%, the weight percentage concentration of the N,N-dimethyl acrylamide is 0.1% to 40%, the weight percentage concentration of the ethylene glycol dimethacrylate is 0.01% to 5%, the weight percentage concentration of the (3-acryloxy-2-hydroxypropoxypropyl)terminated polydimethylsiloxane is 0.1% to 40%, and the weight percentage concentration of the 1-hexanol is 0.1% to 30%.

More preferably, the weight percentage concentration of the ingredients of the composition for manufacturing the silicone hydrogel can be as follows. The weight percentage concentration of the 2-hydroxyethyl methacrylate is 0.1% to 10%, the weight percentage concentration of the 3-methacryloyloxypropyltris(trimethylsilyloxy)silane is 1% to 40%, the weight percentage concentration of the 2-hydroxy-2-methyl-propiophenone is 0.1% to 2%, the weight percentage concentration of the N-vinyl-2-pyrrolidinone is 1% to 35%, the weight percentage concentration of the N,N-dimethyl acrylamide is 1% to 20%, the weight percentage concentration of the ethylene glycol dimethacrylate is 0.1% to 2%, the weight percentage concentration of the (3-acryloxy-2-hydroxypropoxypropyl)terminated polydimethylsiloxane is 1% to 40%, and the weight percentage concentration of the 1-hexanol is 1% to 30%.

The composition for manufacturing the silicone hydrogel can include 2-hydroxyethyl methacrylate, 3-methacryloyloxypropyltris(trimethylsilyloxy)silane, 2-hydroxy-2-methyl-propiophenone, N-vinyl-2-pyrrolidinone, N,N-dimethyl acrylamide, polysiloxane macromer, methyl methacrylate and ethanol.

Preferably, a weight percentage concentration of the ingredients of the composition for manufacturing the silicone hydrogel can be as follows. The weight percentage concentration of the 2-hydroxyethyl methacrylate is 0.05% to 25%, the weight percentage concentration of the 3-methacryloyloxypropyltris(trimethylsilyloxy)silane is 0.1% to 40%, the weight percentage concentration of the 2-hydroxy-2-methyl-propiophenone is 0.01% to 5%, the weight percentage concentration of the N-vinyl-2-pyrrolidinone is 0.1% to 35%, the weight percentage concentration of the N,N-dimethyl acrylamide is 0.1% to 40%, the weight percentage concentration of the polysiloxane macromer is 0.1% to 40%, the weight percentage concentration of the methyl methacrylate is 0.1% to 20%, and the weight percentage concentration of the ethanol is 0.1% to 30%.

More preferably, the weight percentage concentration of the ingredients of the composition for manufacturing the silicone hydrogel can be as follows. The weight percentage concentration of the 2-hydroxyethyl methacrylate is 0.1% to 10%, the weight percentage concentration of the 3-methacryloyloxypropyltris(trimethylsilyloxy)silane is 1% to 40%, the weight percentage concentration of the 2-hydroxy-2-methyl-propiophenone is 0.1% to 2%, the weight percentage concentration of the N-vinyl-2-pyrrolidinone is 1% to 35%, the weight percentage concentration of the N,N-dimethyl acrylamide is 1% to 20%, the weight percentage concentration of the polysiloxane macromer is 1% to 40%, the weight percentage concentration of the methyl methacrylate is 1% to 10%, and the weight percentage concentration of the ethanol is 1% to 20%.

According to one example of the present disclosure, the composition for manufacturing the silicone hydrogel can further include a blue-light blocking agent or a UV blocking agent. Preferably, the weight percentage concentration of the blue-light blocking agent or the UV blocking agent of the composition for manufacturing the silicone hydrogel is 0.01% to 10%. More preferably, the weight percentage concentration of the blue-light blocking agent or the UV blocking agent for manufacturing the composition of the silicone hydrogel is 0.1% to 5%.

By adjusting the ratio of the ingredients of the composition for manufacturing the silicone hydrogel, an oxygen permeability and a hardness of the multifocal contact lens 110 can be effectively enhanced. Furthermore, the composition for manufacturing the silicone hydrogel can selectively include other ingredients according to practical needs.

According to the aforementioned contact lens product 100, the multifocal contact lens 110 can be made of hydrogel. Therefore, the moisture, smoothness and softness of the multifocal contact lens 110 can be maintained, and is capable of long wear. Furthermore, the foreign body sensation can be avoided when wearing the multifocal contact lens 110. The hydrogel can be but is not limited to the contact lens material classified as Group I by U.S. FDA, i.e., nonionic polymers having a low moisture content (less than 50 wt %), such as Helfilcon A&B, Hioxifilcon B, Mafilcon, Polymacon, Tefilcon and Tetrafilcon A. Alternatively, the hydrogel can be but is not limited to the contact lens material classified as Group II by U.S. FDA, i.e., nonionic polymers having a high moisture content (greater than 50 wt %), such as Acofilcon A, Alfafilcon A, Hilafilcon B, Hioxifilcon A, Hioxifilcon B, Hioxifilcon D, Nelfilcon A, Nesofilcon A, Omafilcon A and Samfilcon A. Alternatively, the hydrogel can be but is not limited to the contact lens material classified as Group III by U.S. FDA, i.e., ionic polymers having a low moisture content (less than 50 wt %), such as Deltafilcon A. Alternatively, the hydrogel can be but is not limited to the contact lens material classified as Group IV by U.S. FDA, i.e., ionic polymers having a high moisture content (greater than 50 wt %), such as Etafilcon A, Focofilcon A, Methafilcon A, Methafilcon B, Ocufilcon A, Ocufilcon B, Ocufilcon C, Ocufilcon D, Ocufilcon E, Phemfilcon A and Vifilcon A.

The composition for manufacturing the hydrogel can include 2-hydroxyethyl methacrylate, ethylene glycol dimethacrylate, 2-hydroxy-2-methyl-propiophenone, glycerol, 1,1,1-trimethylol propane trimethacrylate and methacrylic acid.

Preferably, a weight percentage concentration of the ingredients of the composition for manufacturing the hydrogel can be as follows. The weight percentage concentration of the 2-hydroxyethyl methacrylate is 10% to 96%, the weight percentage concentration of the ethylene glycol dimethacrylate is 0.01% to 5%, the weight percentage concentration of the 2-hydroxy-2-methyl-propiophenone is 0.01% to 5%, the weight percentage concentration of the glycerol is 0.1% to 30%, the weight percentage concentration of the 1,1,1-trimethylol propane trimethacrylate is 0.01% to 5%, and the weight percentage concentration of the methacrylic acid is 0.01% to 5%.

More preferably, the weight percentage concentration of the ingredients of the composition for manufacturing the hydrogel can be as follows. The weight percentage concentration of the 2-hydroxyethyl methacrylate is 40% to 96%, the weight percentage concentration of the ethylene glycol dimethacrylate is 0.1% to 2%, the weight percentage concentration of the 2-hydroxy-2-methyl-propiophenone is 0.1% to 2%, the weight percentage concentration of the glycerol is 0.1% to 20%, the weight percentage concentration of the 1,1,1-trimethylol propane trimethacrylate is 0.1% to 2%, and the weight percentage concentration of the methacrylic acid is 0.1% to 2%.

The composition for manufacturing the hydrogel can include 2-hydroxyethyl methacrylate, ethylene glycol dimethacrylate, 2-hydroxy-2-methyl-propiophenone, glycerol, 1,1,1-trimethylol propane trimethacrylate and glycerol monomethacrylate.

Preferably, a weight percentage concentration of the ingredients of the composition for manufacturing the hydrogel can be as follows. The weight percentage concentration of the 2-hydroxyethyl methacrylate is 10% to 94.87%, the weight percentage concentration of the ethylene glycol dimethacrylate is 0.01% to 5%, the weight percentage concentration of the 2-hydroxy-2-methyl-propiophenone is 0.01% to 5%, the weight percentage concentration of the glycerol is 0.1% to 30%, the weight percentage concentration of the 1,1,1-trimethylol propane trimethacrylate is 0.01% to 5%, and the weight percentage concentration of the glycerol monomethacrylate is 5% to 60%.

More preferably, the weight percentage concentration of the ingredients of the composition for manufacturing the hydrogel can be as follows. The weight percentage concentration of the 2-hydroxyethyl methacrylate is 40% to 79.6%, the weight percentage concentration of the ethylene glycol dimethacrylate is 0.1% to 2%, the weight percentage concentration of the 2-hydroxy-2-methyl-propiophenone is 0.1% to 2%, the weight percentage concentration of the glycerol is 0.1% to 20%, the weight percentage concentration of the 1,1,1-trimethylol propane trimethacrylate is 0.1% to 2%, and the weight percentage concentration of the glycerol monomethacrylate is 20% to 50%.

The composition for manufacturing the hydrogel can include 2-hydroxyethyl methacrylate, ethylene glycol dimethacrylate, 2-hydroxy-2-methyl-propiophenone, glycerol and N-vinyl-2-pyrrolidinone.

Preferably, a weight percentage concentration of the ingredients of the composition for manufacturing the hydrogel can be as follows. The weight percentage concentration of the 2-hydroxyethyl methacrylate is 10% to 96%, the weight percentage concentration of the ethylene glycol dimethacrylate is 0.01% to 5%, the weight percentage concentration of the 2-hydroxy-2-methyl-propiophenone is 0.01% to 5%, the weight percentage concentration of the glycerol is 0.1% to 30%, and the weight percentage concentration of the N-vinyl-2-pyrrolidinone is 0.1% to 25%.

More preferably, the weight percentage concentration of the ingredients of the composition for manufacturing the hydrogel can be as follows. The weight percentage concentration of the 2-hydroxyethyl methacrylate is 40% to 96%, the weight percentage concentration of the ethylene glycol dimethacrylate is 0.1% to 2%, the weight percentage concentration of the 2-hydroxy-2-methyl-propiophenone is 0.1% to 2%, the weight percentage concentration of the glycerol is 1% to 20%, and the weight percentage concentration of the N-vinyl-2-pyrrolidinone is 0.1% to 10%.

According to one example of the present disclosure, the composition for manufacturing the hydrogel can further include a blue-light blocking agent or a UV blocking agent. Preferably, a weight percentage concentration of the blue-light blocking agent or the UV blocking agent of the composition for manufacturing the hydrogel is 0.01% to 10%. More preferably, the weight percentage concentration of the blue-light blocking agent or the UV blocking agent for manufacturing the composition of the hydrogel is 0.1% to 5%.

By adjusting the ratio of the ingredients of the composition for manufacturing the hydrogel, a moisture content and a softness of the multifocal contact lens 110 can be effectively enhanced. Furthermore, the composition for manufacturing the hydrogel can selectively include other ingredients according to practical needs. The monomers used in the composition for manufacturing the hydrogel and the monomers used in the composition for silicone hydrogel, such as 2-hydroxyethyl methacrylate, methacrylic acid, glycerol monomethacrylate, N-vinyl-2-pyrrolidinone, 3-methacryloyloxypropyltris(trimethylsilyloxy)silane, N,N-dimethyl acrylamide, 3-(3-methacryloxy-2-hydroxy-propoxy)propylbis(trimethylsiloxy)methylsilane, (3-acryloxy-2-hydroxypropoxypropyl)terminated polydimethylsiloxane and methyl methacrylate can be interchanged according to practical needs.

Referring back to FIG. 2, when a diameter of the central region 111 of the multifocal contact lens 110 is DiC, the following condition can be satisfied: 4 mm<DiC≤10 mm. Therefore, the diameter can be flexibly adjusted according to the pupil size of different physiological states, so that the accuracy for correcting myopia provided by the central region 111 can be enhanced, and the sight can be completely and clearly focused on retina. Preferably, the following condition can be satisfied: 5 mm≤DiC≤9 mm.

When an outer diameter of the first annular region 112 of the multifocal contact lens 110 is DiP1, the following condition can be satisfied: 6 mm≤DiP1≤17 mm. Therefore, the outer diameter can be flexibly adjusted according to the size of palpebral fissure, so that a proper comfort and fitness of the multifocal contact lens 110 can be provided, and the wearing stability of the multifocal contact lens 110 can be enhanced. Preferably, the following condition can be satisfied: 7 mm≤DiP≤15 mm.

When the diameter of the central region 111 of the multifocal contact lens 110 is DiC, and the outer diameter of the first annular region 112 of the multifocal contact lens 110 is DiP1, the following condition can be satisfied: 0.15≤DiC/DiP1<1. Therefore, the value of DiC/DiP1 is proper, which is favorable to design the multifocal contact lens 110 according to the physiological state of individual eyeball. Accordingly, it is favorable to correct myopia.

When a diopter of the central region 111 of the multifocal contact lens 110 is PowC, the following condition can be satisfied: −6.00 D≤PowC≤−0.25 D. Therefore, a proper correction for myopia can be provided according to the need of users. Accordingly, a clear image can be provided.

When a maximal diopter of the first annular region 112 of the multifocal contact lens 110 is PowP1, the following condition can be satisfied: −5.50 D≤PowP1≤−0.50 D. Therefore, the maximal diopter of the first annular region 112 can be properly designed, which is favorable to correct myopia.

When the diopter of the central region 111 of the multifocal contact lens 110 is PowC, and the maximal diopter of the first annular region 112 of the multifocal contact lens 110 is PowP1, the following condition can be satisfied: |PowC−PowP1|≤12 D. Therefore, it is favorable to correct myopia. Furthermore, the increase degree of the diopter of the first annular region 112 can be moderated, so that the discomfort resulted from the excessive increase degree of the diopter can be avoided. Alternatively, the following condition can be satisfied: |PowC−PowP1|≤10 D. Alternatively, the following condition can be satisfied: |PowC−PowP1|≤5 D. Alternatively, the following condition can be satisfied: |PowC−PowP1|≤3 D. Alternatively, the following condition can be satisfied: |PowC−PowP1|≤2 D. Alternatively, the following condition can be satisfied: |PowC−PowP1|≤1.5 D. Alternatively, the following condition can be satisfied: |PowC−PowP1≤1 D. Alternatively, the following condition can be satisfied: |PowC−PowP1|≤0.5 D. Alternatively, the following condition can be satisfied: |PowC−PowP1|≤0.25 D.

Figure 3:
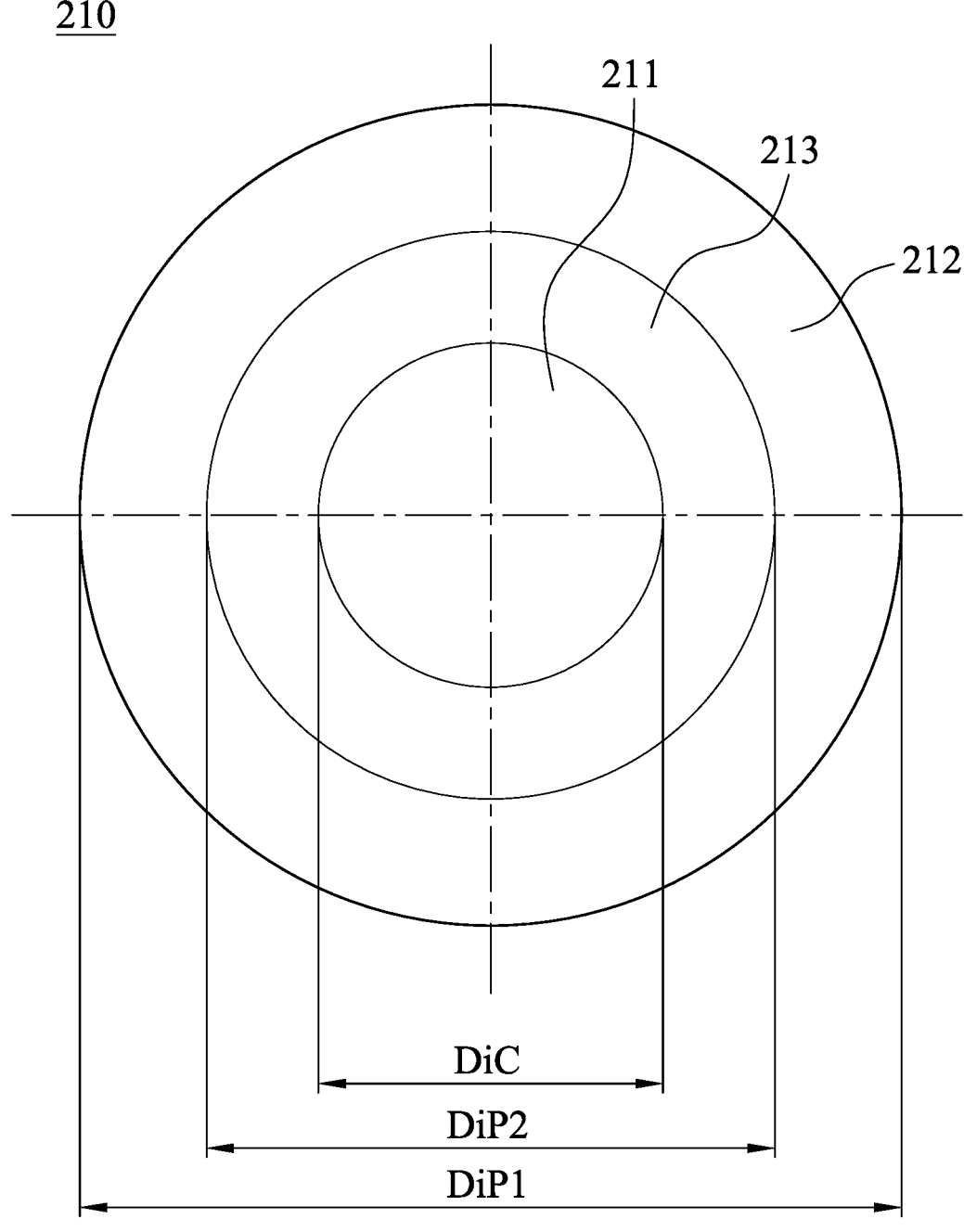
FIG. 3 is a schematic plan view of a multifocal contact lens according to another embodiment of the present disclosure.

FIG. 3 is a schematic plan view of a multifocal contact lens 210 according to another embodiment of the present disclosure. The multifocal contact lens 210 includes a central region 211, a first annular region 212 and a second annular region 213. The central region 211, the second annular region 213 and the first annular region 212 are sequentially connected from a center of the multifocal contact lens 210 to a periphery of the multifocal contact lens 210 and are concentric. A diameter of the central region 211 of the multifocal contact lens 210 is DiC, an outer diameter of the first annular region 212 of the multifocal contact lens 210 is DiP1, and an outer diameter of the second annular region 213 of the multifocal contact lens 210 is DiP2. A diopter of the second annular region 213 is different from a diopter of the central region 211, and a diopter of the first annular region 212 is different from a diopter of the central region 211. Therefore, the multifocal contact lens 210 is featured with multi-focus function, the peripheral sight can be focused in front of the retina, which can moderate the increase of the axial length of the eyeball, and the exacerbation of myopia can be prevented. According to one example of the present disclosure, the diopter of the central region 211 is fixed.

At least one of the central region 211, the first annular region 212 and the second annular region 213 of the multifocal contact lens 210 is aspheric. Therefore, it is favorable to design the first annular region 212 and/or the second annular region 213 with a gradient diopter.

When the outer diameter of the second annular region 213 of the multifocal contact lens 210 is DiP2, the following condition can be satisfied: 5 mm≤DiP2≤13 mm. Therefore, the increase degree of the diopter can be moderated. Preferably, the following condition can be satisfied: 6 mm≤DiP2≤12 mm.

When the diameter of the central region 211 of the multifocal contact lens 210 is DiC, and the outer diameter of the second annular region 213 of the multifocal contact lens 210 is DiP2, the following condition can be satisfied: 0.2≤DiC/DiP2<1. Therefore, the increase degree of the diopter of the second annular region 213 can be moderated, so that the discomfort resulted from the excessive increase degree of the diopter can be avoided.

The other properties of the multifocal contact lens 210 can be the same as that of the multifocal contact lens 110, and will not be repeated herein.

Figure 4:
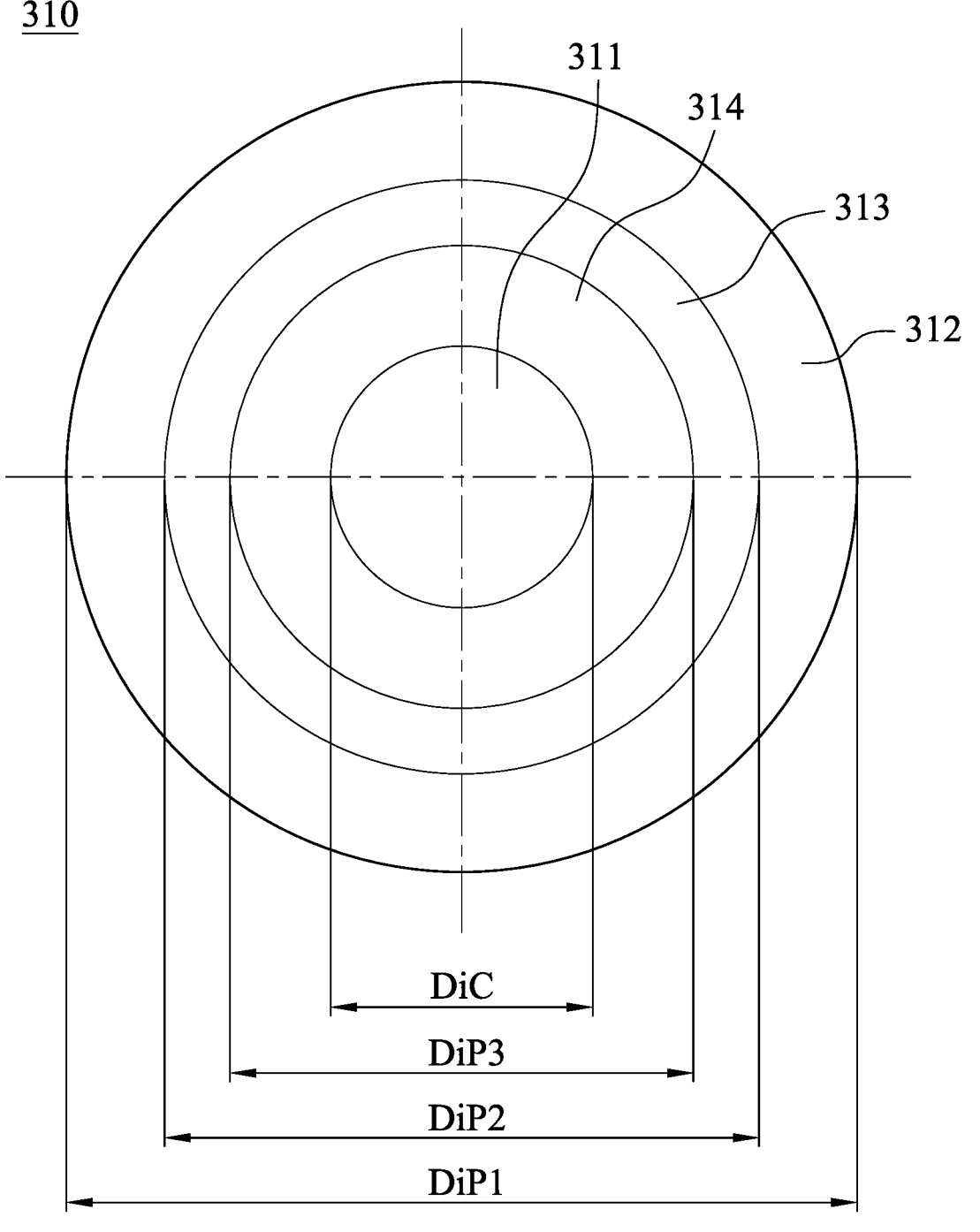
FIG. 4 is a schematic plan view of a multifocal contact lens according to yet another embodiment of the present disclosure.

FIG. 4 is a schematic plan view of a multifocal contact lens 310 according to yet another embodiment of the present disclosure. The multifocal contact lens 310 includes a central region 311, a first annular region 312, a second annular region 313 and a third annular region 314. The central region 311, the third annular region 314, the second annular region 313 and the first annular region 312 are sequentially connected from a center of the multifocal contact lens 310 to a periphery of the multifocal contact lens 310 and are concentric. A diameter of the central region 311 of the multifocal contact lens 310 is DiC, an outer diameter of the first annular region 312 of the multifocal contact lens 310 is DiP1, an outer diameter of the second annular region 313 of the multifocal contact lens 310 is DiP2, and an outer diameter of the third annular region 314 of the multifocal contact lens 310 is DiP3. A diopter of the third annular region 314 is different from a diopter of the central region 311, a diopter of the second annular region 313 is different from a diopter of the central region 311, and a diopter of the first annular region 312 is different from a diopter of the central region 311. Therefore, the multifocal contact lens 310 is featured with multi-focus function, the peripheral sight can be focused in front of the retina, which can moderate the increase of the axial length of the eyeball, and the exacerbation of myopia can be prevented. According to one example of the present disclosure, the diopter of the central region 311 is fixed.

As shown in FIGS. 2-4, the multifocal contact lens (110, 210, 310) according to the present disclosure can have at least one annular region (the first annular region (112, 212, 312), the second annular region (213, 313), the third annular region (314)) concentrically surrounding the central region (111, 211, 311). The number and the diopter of the annular region can be flexibly adjusted according to the physiological state of individual eyeball, so that the effect of correcting myopia can be enhanced. Accordingly, the myopia can be effectively prevented or controlled.

According to the present disclosure, another contact lens product is provided. The contact lens product includes a multifocal contact lens. A composition for manufacturing the multifocal contact lens includes a blue-light blocking agent. Therefore, the multifocal contact lens can block high-energy blue lights, and the probability that the retina hurt by the blue lights can be reduced. The details of the blue-light blocking agent, the material and other properties of the multifocal contact lens can refer to the content of FIGS. 1-4, and will not be repeated herein.

1st Example

In the 1st example, a multifocal contact lens includes a central region and a first annular region. The first annular region concentrically surrounds the central region. At least one of the central region and the first annular region is aspheric. The structure of the multifocal contact lens of the 1st example can refer to FIG. 2.

In the multifocal contact lens of the 1st example, a diameter of the central region of the multifocal contact lens is DiC, an outer diameter of the first annular region of the multifocal contact lens is DiP1, a diopter of the central region of the multifocal contact lens is PowC, a maximal diopter of the first annular region of the multifocal contact lens is PowP1, the value of DiC, DiP1, DiC/DiP1, PowC, PowP1, |PowC−PowP1| of the 1st example are listed in Table 1.

TABLE 1

| 1st example | | | |
|---|---|---|---|
| DiC (mm) | 5.00 | PowC (D) | −0.25 |
| DiP1 (mm) | 13.00 | PowP1 (D) | 0.25 |
| DiC/DiP1 | 0.38 | |PowC-PowP1| (D) | 0.50 |

Figure 5:
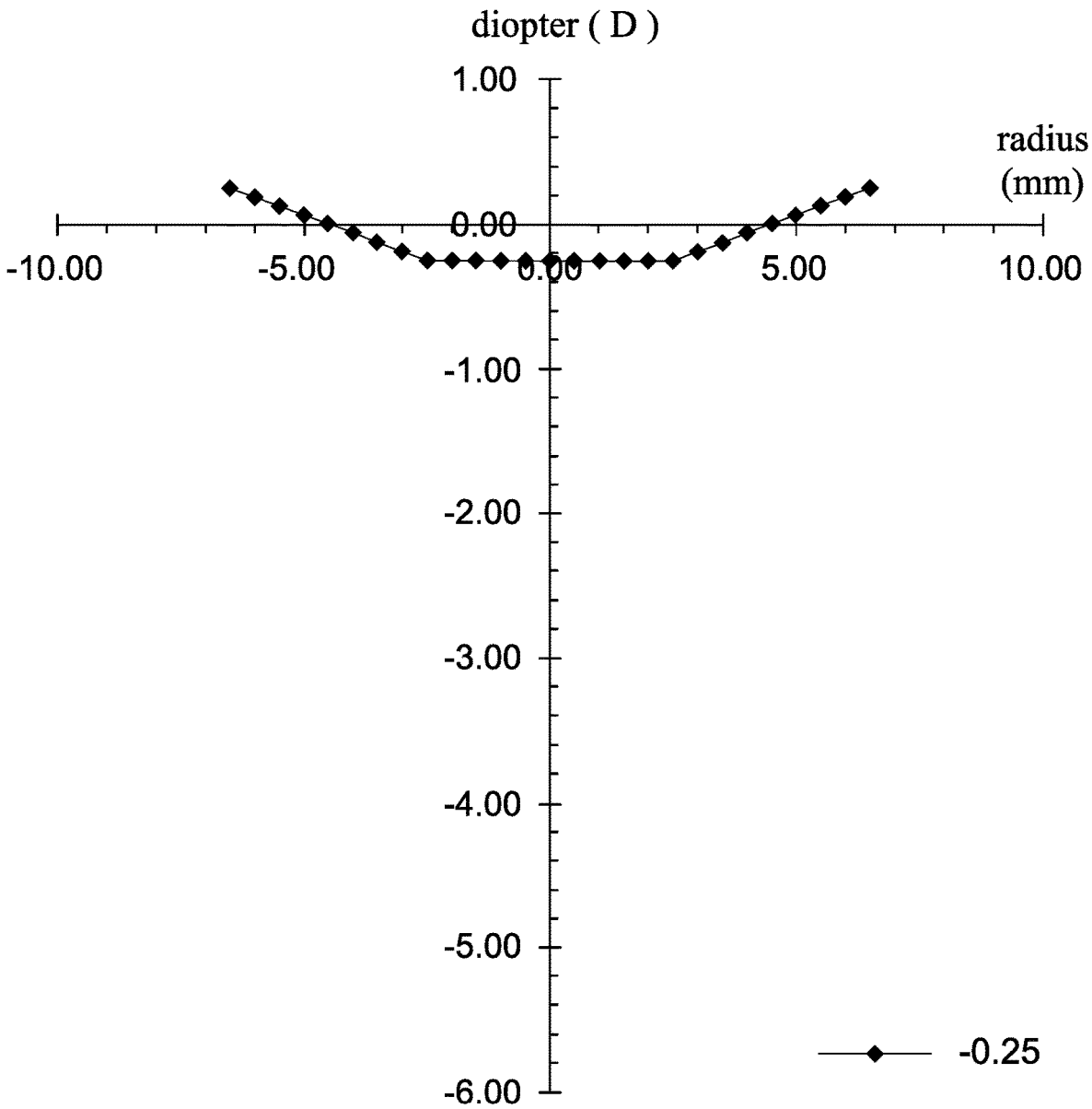
FIG. 5 shows a relationship between a radius and a diopter of a multifocal contact lens of the 1st example.

Please refer to Table 2 and FIG. 5 simultaneously, radiuses and the correspondent diopters of the multifocal contact lens of the 1st example are listed in Table 2. FIG. 5 shows a relationship between the radius and the diopter of the multifocal contact lens of the 1st example (the negative radius having an opposite direction with the positive radius). As shown in Table 2 and FIG. 5, the diopter of the central region is fixed, and the diopter of the first annular region is different from the diopter of the central region. Specifically, the diopter of the first annular region is greater than the diopter of the central region, and the diopter of the first annular region increases when away from the central region.

TABLE 2

| 1st example | | | |
|---|---|---|---|
| radius (mm) | diopter (D) | radius (mm) | diopter (D) |
| −6.50 | 0.25 | 0.50 | −0.25 |
| −6.00 | 0.19 | 1.00 | −0.25 |
| −5.50 | 0.13 | 1.50 | −0.25 |
| −5.00 | 0.06 | 2.00 | −0.25 |
| −4.50 | 0.00 | 2.50 | −0.25 |
| −4.00 | −0.06 | 3.00 | −0.19 |
| −3.50 | −0.13 | 3.50 | −0.13 |
| −3.00 | −0.19 | 4.00 | −0.06 |
| −2.50 | −0.25 | 4.50 | 0.00 |
| −2.00 | −0.25 | 5.00 | 0.06 |
| −1.50 | −0.25 | 5.50 | 0.13 |
| −1.00 | −0.25 | 6.00 | 0.19 |
| −0.50 | −0.25 | 6.50 | 0.25 |
| 0.00 | −0.25 | | |

In the 1st example, the multifocal contact lens is made of hydrogel. A composition for manufacturing the hydrogel of the 1st example is listed in Table 3.

TABLE 3

| Ingredient | Content (wt %) |
|---|---|
| 2-hydroxyethyl methacrylate | 82 |
| 2-(2'-hydroxy-5'-methacryloxyethylphenyl)-2H-benzotriazole | 1.2 |
| ethylene glycol dimethacrylate | 0.4 |
| 2-hydroxy-2-methyl-propiophenone | 0.5 |
| glycerol | 13.5 |
| 1,1,1-trimethylol propane trimethacrylate | 0.2 |
| methacrylic acid | 2.2 |

As shown in Table 3, the multifocal contact lens of the 1st example can block UV lights by adding 2-(2'-hydroxy-5'-methacryloxyethylphenyl)-2H-benzotriazole.

2nd Example

In the 2nd example, a multifocal contact lens includes a central region, a first annular region and a second annular region. The central region, the second annular region and the first annular region are sequentially connected from a center of the multifocal contact lens to a periphery of the multifocal contact lens and are concentric. At least one of the central region, the second annular region, and the first annular region is aspheric. The structure of the multifocal contact lens of the 2nd example can refer to FIG. 3.

In the multifocal contact lens of the 2nd example, a diameter of the central region of the multifocal contact lens is DiC, an outer diameter of the first annular region of the multifocal contact lens is DiP1, an outer diameter of the second annular region of the multifocal contact lens is DiP2, a diopter of the central region of the multifocal contact lens is PowC, a maximal diopter of the first annular region of the multifocal contact lens is PowP1, a maximal diopter of the second annular region of the multifocal contact lens is PowP2, the value of DiC, DiP1, DiP2, DiC/DiP1, DiC/DiP2, PowC, PowP1, PowP2, |PowC−PowP1| of the 2nd example are listed in Table 4.

TABLE 4

| 2nd example | | | |
|---|---|---|---|
| DiC (mm) | 5.00 | PowC (D) | −0.50 |
| DiP1 (mm) | 16.00 | PowP1 (D) | 0.50 |
| DiP2 (mm) | 13.00 | PowP2 (D) | 0.50 |
| DiC/DiP1 | 0.31 | |PowC - PowP1| (D) | 1.00 |
| DiC/DiP2 | 0.38 | | |

Figure 6:
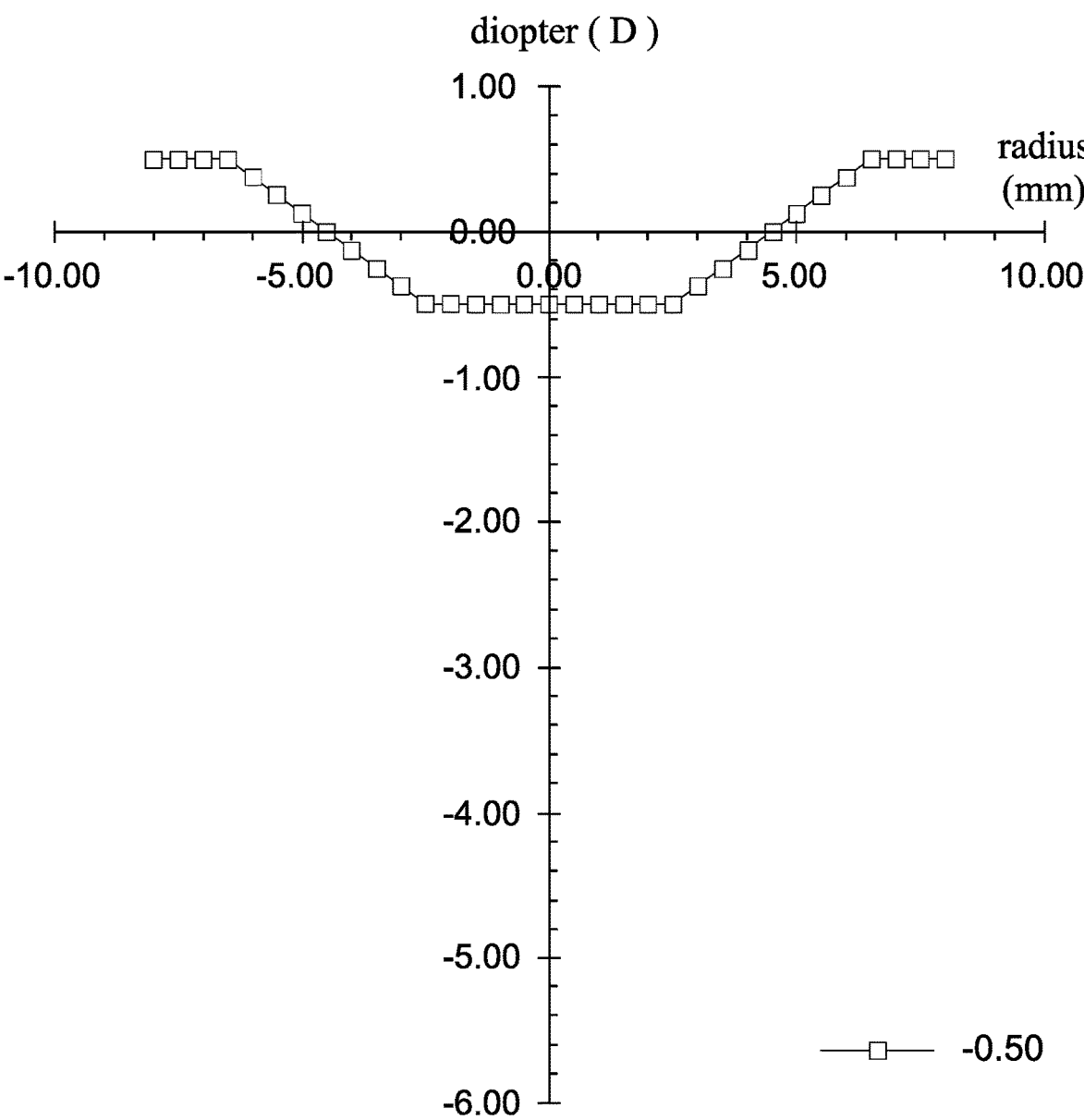
FIG. 6 shows a relationship between a radius and a diopter of a multifocal contact lens of the 2nd example.

Please refer to Table 5 and FIG. 6 simultaneously, radiuses and the correspondent diopters of the multifocal contact lens of the 2nd example are listed in Table 5. FIG. 6 shows a relationship between the radius and the diopter of the multifocal contact lens of the 2nd example (the negative radius having an opposite direction with the positive radius). As shown in Table 5 and FIG. 6, the diopter of the central region is fixed, the diopter of the second annular region is different from the diopter of the central region, and the diopter of the first annular region is different from the diopter of the central region. Specifically, the diopter of the second annular region is greater than the diopter of the central region, the diopter of the second annular region increases when away from the central region, the diopter of the first annular region is greater than the diopter of the central region, and the diopter of the first annular region is fixed.

TABLE 5

| 2nd example | | | |
|---|---|---|---|
| radius (mm) | diopter (D) | radius (mm) | diopter (D) |
| −8.00 | 0.50 | 0.50 | −0.50 |
| −7.50 | 0.50 | 1.00 | −0.50 |
| −7.00 | 0.50 | 1.50 | −0.50 |
| −6.50 | 0.50 | 2.00 | −0.50 |
| −6.00 | 0.38 | 2.50 | −0.50 |
| −5.50 | 0.25 | 3.00 | −0.38 |
| −5.00 | 0.13 | 3.50 | −0.25 |
| −4.50 | 0.00 | 4.00 | −0.13 |
| −4.00 | −0.13 | 4.50 | 0.00 |
| −3.50 | −0.25 | 5.00 | 0.13 |
| −3.00 | −0.38 | 5.50 | 0.25 |
| −2.50 | −0.50 | 6.00 | 0.38 |
| −2.00 | −0.50 | 6.50 | 0.50 |
| −1.50 | −0.50 | 7.00 | 0.50 |
| −1.00 | −0.50 | 7.50 | 0.50 |
| −0.50 | −0.50 | 8.00 | 0.50 |
| 0.00 | −0.50 | | |

In the 2nd example, the multifocal contact lens is made of hydrogel. A composition for manufacturing the hydrogel of the 2nd example is listed in Table 6A

TABLE 6A

| Ingredient | Content (wt %) |
|---|---|
| 2-hydroxyethyl methacrylate | 44.8 |
| 2-(2'-hydroxy-5'-methacryloxyethylphenyl)-2H-benzotriazole | 1.2 |
| ethylene glycol dimethacrylate | 0.6 |
| 2-hydroxy-2-methyl-propiophenone | 0.6 |
| glycerol | 10.5 |
| 1,1,1-trimethylol propane trimethacrylate | 0.3 |
| glycerol monomethacrylate | 42 |

As shown in Table 6A, the multifocal contact lens of the 2nd example can block UV lights by adding 2-(2'-hydroxy-5'-methacryloxyethylphenyl)-2H-benzotriazole.

Figure 7:
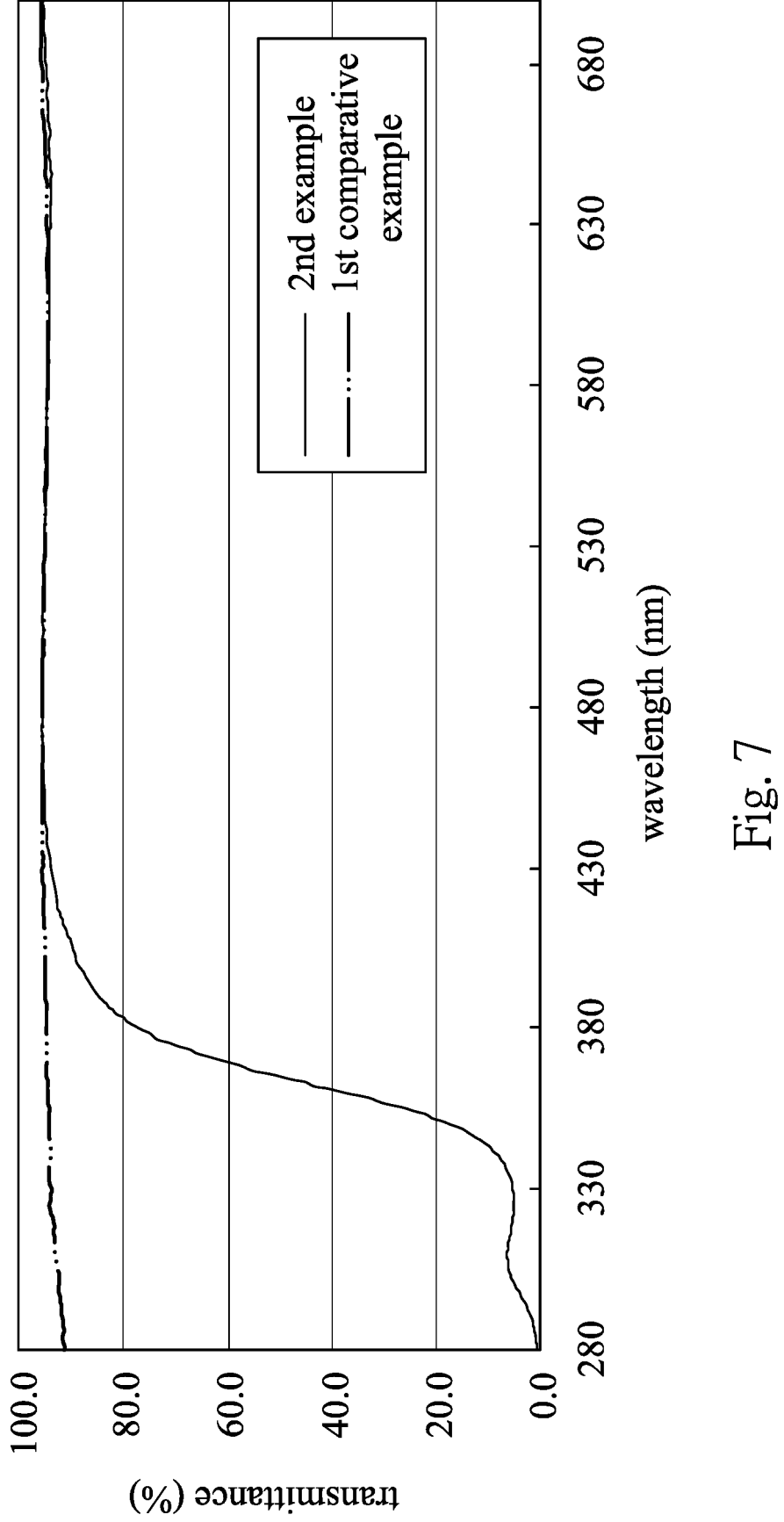
FIG. 7 shows a relationship between a wavelength and a transmittance of the multifocal contact lens of the 2nd example and a multifocal contact lens of the 1st comparative example.

FIG. 7 shows a relationship between a wavelength and a transmittance of the multifocal contact lens of the 2nd example and a multifocal contact lens of the 1st comparative example. The difference between the 1st comparative example and the 2nd example is the 1st comparative example in lack of UV blocking agent. Specifically, a composition of the 1st comparative example is formulated by replacing the 2-(2'-hydroxy-5'-methacryloxyethylphenyl)-2H-benzotriazole in the 2nd example with the 2-hydroxyethyl methacrylate. In FIG. 7, a blocking rate for UV-A (the UV lights with a wavelength ranging from 316 nm to 380 nm) of the 1st comparative example and the 2nd example can be calculated by the following formula: (1−an average transmittance of the wavelength ranging from 316 nm to 380 nm)×100%. Furthermore, a blocking rate for UV-B (the UV lights with a wavelength ranging from 280 nm to 315 nm) of the 1st comparative example and the 2nd example can be calculated by the following formula: (1−an average transmittance of the wavelength ranging from 280 nm to 315 nm)×100%. The calculated results are listed in Table 6B.

TABLE 6B

| | 1st comparative example | 2nd example |
|---|---|---|
| blocking rate for UV-A (%) (316 nm-380 nm) | 5.92 | 73.19 |
| blocking rate for UV-B (%) (280 nm-315 nm) | 7.91 | 96.36 |

As shown in Table 6B, comparing to the 1st comparative example, the blocking rate for UV-A and the blocking rate for UV-B of the 2nd example is much greater than that of the 1st comparative example. In other words, the multifocal contact lens of the 2nd example can effectively block the UV lights, so that the probability that the retina hurt by the UV lights can be reduced.

3rd Example

In the 3rd example, a multifocal contact lens includes a central region, a first annular region and a second annular region. The central region, the second annular region and the first annular region are sequentially connected from a center of the multifocal contact lens to a periphery of the multifocal contact lens and are concentric. At least one of the central region, the second annular region, and the first annular region is aspheric. The structure of the multifocal contact lens of the 3rd example can refer to FIG. 3.

In the multifocal contact lens of the 3rd example, a diameter of the central region of the multifocal contact lens is DiC, an outer diameter of the first annular region of the multifocal contact lens is DiP1, an outer diameter of the second annular region of the multifocal contact lens is DiP2, a diopter of the central region of the multifocal contact lens is PowC, a maximal diopter of the first annular region of the multifocal contact lens is PowP1, a maximal diopter of the second annular region of the multifocal contact lens is PowP2, the value of DiC, DiP1, DiP2, DiC/DiP1, DiC/DiP2, PowC, PowP1, PowP2, |PowC−PowP1| of the 3rd example are listed in Table 7.

TABLE 7

| 3rd example | | | |
|---|---|---|---|
| DiC (mm) | 4.00 | PowC (D) | −1.00 |
| DiP1 (mm) | 15.00 | PowP1 (D) | 0.25 |
| DiP2 (mm) | 6.00 | PowP2 (D) | −0.50 |
| DiC/DiP1 | 0.27 | |PowC - PowP1| (D) | 1.25 |
| DiC/DiP2 | 0.67 | | |

Figure 8:
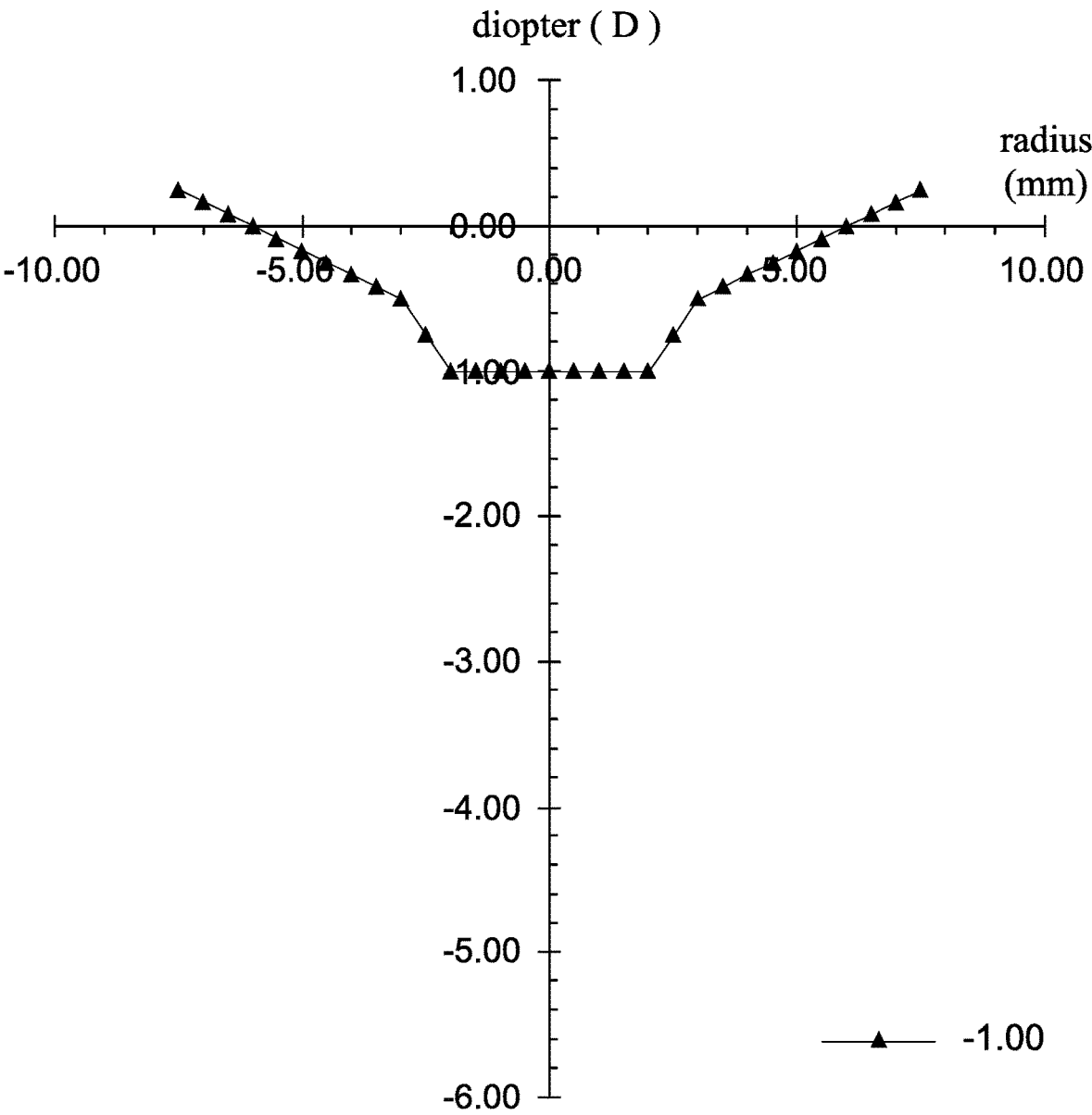
FIG. 8 shows a relationship between a radius and a diopter of a multifocal contact lens of the 3rd example.

Please refer to Table 8 and FIG. 8 simultaneously, radiuses and the correspondent diopters of the multifocal contact lens of the 3rd example are listed in Table 8. FIG. 8 shows a relationship between the radius and the diopter of the multifocal contact lens of the 3rd example (the negative radius having an opposite direction with the positive radius). As shown in Table 8 and FIG. 8, the diopter of the central region is fixed, the diopter of the second annular region is different from the diopter of the central region, and the diopter of the first annular region is different from the diopter of the central region. Specifically, the diopter of the second annular region is greater than the diopter of the central region, the diopter of the second annular region increases when away from the central region, the diopter of the first annular region is greater than the diopter of the central region, and the diopter of the first annular region increases when away from the central region.

TABLE 8

| 3rd example | | | |
|---|---|---|---|
| radius (mm) | diopter (D) | radius (mm) | diopter (D) |
| −7.50 | 0.25 | 0.50 | −1.00 |
| −7.00 | 0.17 | 1.00 | −1.00 |
| −6.50 | 0.08 | 1.50 | −1.00 |
| −6.00 | 0.00 | 2.00 | −1.00 |
| −5.50 | −0.08 | 2.50 | −0.75 |
| −5.00 | −0.17 | 3.00 | −0.50 |
| −4.50 | −0.25 | 3.50 | −0.42 |
| −4.00 | −0.33 | 4.00 | −0.33 |
| −3.50 | −0.42 | 4.50 | −0.25 |
| −3.00 | −0.50 | 5.00 | −0.17 |
| −2.50 | −0.75 | 5.50 | −0.08 |
| −2.00 | −1.00 | 6.00 | 0.00 |
| −1.50 | −1.00 | 6.50 | 0.08 |
| −1.00 | −1.00 | 7.00 | 0.17 |
| −0.50 | −1.00 | 7.50 | 0.25 |
| 0.00 | −1.00 | | |

In the 3rd example, the multifocal contact lens is made of hydrogel. A composition for manufacturing the hydrogel of the 3rd example is listed in Table 9.

TABLE 9

| Ingredient | Content (wt %) |
|---|---|
| 2-hydroxyethyl methacrylate | 91 |
| 2-(2'-hydroxy-5'-methacryloxyethylphenyl)-2H-benzotriazole | 1 |
| ethylene glycol dimethacrylate | 0.6 |
| 2-hydroxy-2-methyl-propiophenone | 0.6 |
| glycerol | 6.3 |
| N-vinyl-2-pyrrolidinone | 0.5 |

As shown in Table 9, the multifocal contact lens of the 3rd example can block UV lights by adding 2-(2'-hydroxy-5'-methacryloxyethylphenyl)-2H-benzotriazole.

4th Example

In the 4th example, a multifocal contact lens includes a central region and a first annular region. The first annular region concentrically surrounds the central region. At least one of the central region and the first annular region is aspheric. The structure of the multifocal contact lens of the 4th example can refer to FIG. 2.

In the multifocal contact lens of the 4th example, a diameter of the central region of the multifocal contact lens is DiC, an outer diameter of the first annular region of the multifocal contact lens is DiP1, a diopter of the central region of the multifocal contact lens is PowC, a maximal diopter of the first annular region of the multifocal contact lens is PowP1, the value of DiC, DiP1, DiC/DiP1, PowC, PowP1, |PowC−PowP1| of the 4th example are listed in Table 10.

TABLE 10

| 4th example | | | |
|---|---|---|---|
| DiC (mm) | 7.00 | PowC (D) | −1.50 |
| DiP1 (mm) | 14.00 | PowP1 (D) | −1.00 |
| DiC/DiP1 | 0.50 | \|PowC - PowP1\| (D) | 0.50 |

Figure 9:
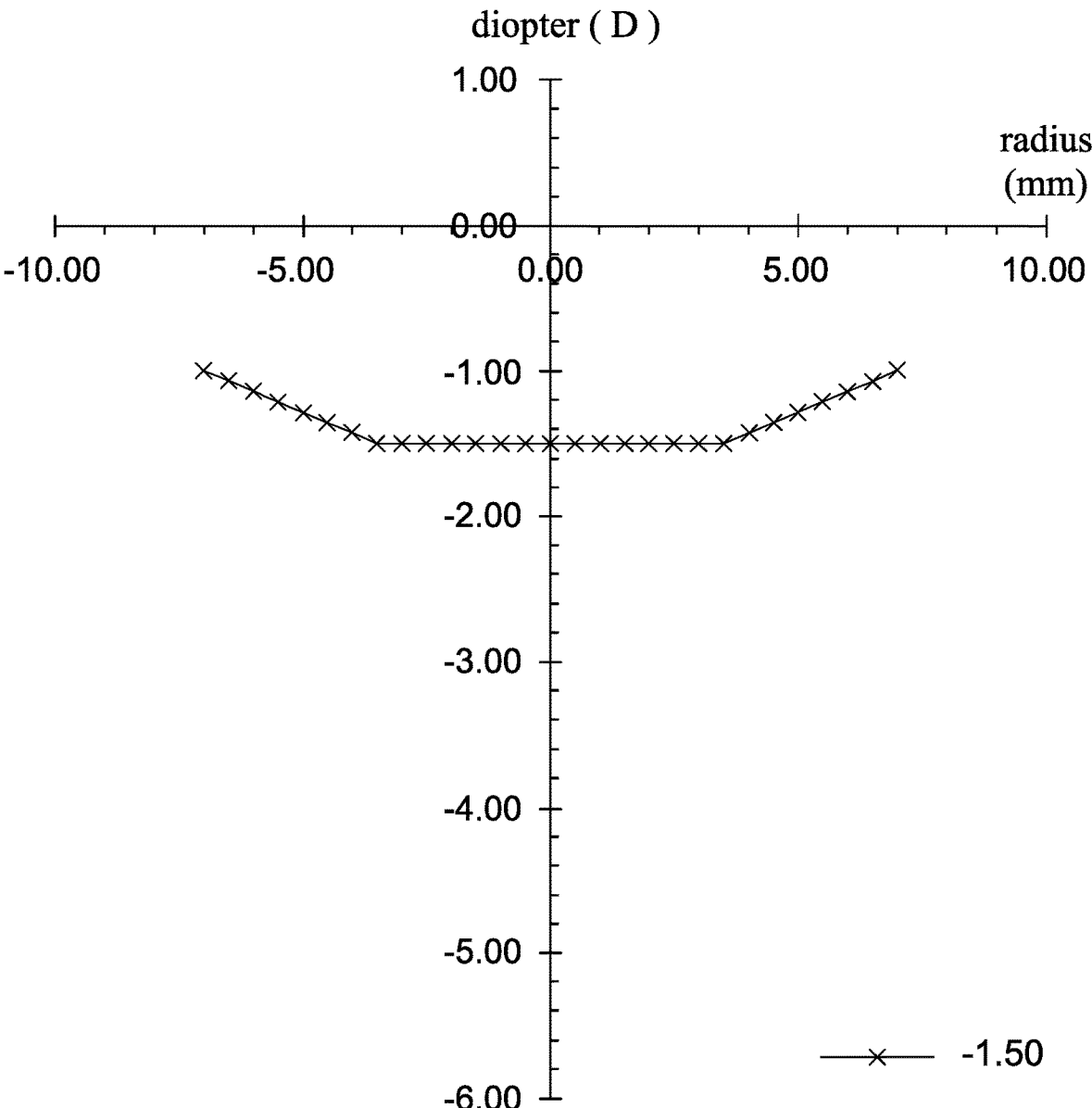
FIG. 9 shows a relationship between a radius and a diopter of a multifocal contact lens of the 4th example.

Please refer to Table 11 and FIG. 9 simultaneously, radiuses and the correspondent diopters of the multifocal contact lens of the 4th example are listed in Table 11. FIG. 9 shows a relationship between the radius and the diopter of the multifocal contact lens of the 4th example (the negative radius having an opposite direction with the positive radius). As shown in Table 11 and FIG. 9, the diopter of the central region is fixed, and the diopter of the first annular region is different from the diopter of the central region. Specifically, the diopter of the first annular region is greater than the diopter of the central region, and the diopter of the first annular region increases when away from the central region.

TABLE 11

| 4th example | | | |
|---|---|---|---|
| radius (mm) | diopter (D) | radius (mm) | diopter (D) |
| −7.00 | −1.00 | 0.50 | −1.50 |
| −6.50 | −1.07 | 1.00 | −1.50 |
| −6.00 | −1.14 | 1.50 | −1.50 |
| −5.50 | −1.21 | 2.00 | −1.50 |
| −5.00 | −1.29 | 2.50 | −1.50 |
| −4.50 | −1.36 | 3.00 | −1.50 |
| −4.00 | −1.43 | 3.50 | −1.50 |
| −3.50 | −1.50 | 4.00 | −1.43 |
| −3.00 | −1.50 | 4.50 | −1.36 |
| −2.50 | −1.50 | 5.00 | −1.29 |

TABLE 11-continued

| 4th example | | | |
|---|---|---|---|
| radius (mm) | diopter (D) | radius (mm) | diopter (D) |
| −2.00 | −1.50 | 5.50 | −1.21 |
| −1.50 | −1.50 | 6.00 | −1.14 |
| −1.00 | −1.50 | 6.50 | −1.07 |
| −0.50 | −1.50 | 7.00 | −1.00 |
| 0.00 | −1.50 | | |

In the 4th example, the multifocal contact lens is made of hydrogel. A composition for manufacturing the hydrogel of the 4th example is listed in Table 12A.

TABLE 12A

| Ingredient | Content (wt %) |
|---|---|
| 2-hydroxyethyl methacrylate | 82 |
| 2-(4-benzoyl-3-hydroxyphenoxy)ethyl acrylate | 1 |
| ethylene glycol dimethacrylate | 0.4 |
| 2-hydroxy-2-methyl-propiophenone | 0.6 |
| glycerol | 13.6 |
| 1,1,1-trimethylol propane trimethacrylate | 0.2 |
| methacrylic acid | 2.2 |

As shown in Table 12A, the multifocal contact lens of the 4th example can block UV lights by adding 2-(4-benzoyl-3-hydroxyphenoxy)ethyl acrylate.

Figure 10:
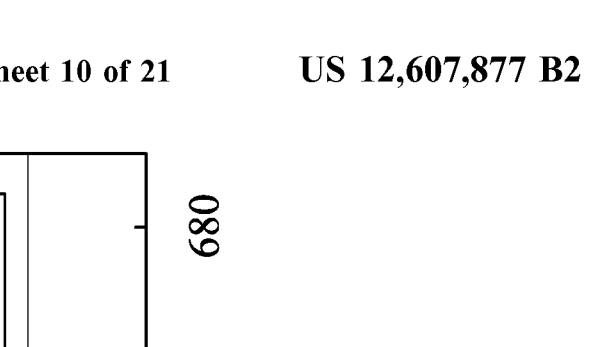
FIG. 10 shows a relationship between a wavelength and a transmittance of the multifocal contact lens of the 4th example and a multifocal contact lens of the 2nd comparative example.

FIG. 10 shows a relationship between a wavelength and a transmittance of the multifocal contact lens of the 4th example and a multifocal contact lens of the 2nd comparative example. The difference between the 2nd comparative example and the 4th example is the 2nd comparative example in lack of UV blocking agent. Specifically, a composition of the 2nd comparative example is formulated by replacing the 2-(4-benzoyl-3-hydroxyphenoxy)ethyl acrylate in the 4th example with the 2-hydroxyethyl methacrylate. In FIG. 10, a blocking rate for UV-A (the UV lights with a wavelength ranging from 316 nm to 380 nm) of the 2nd comparative example and the 4th example can be calculated by the following formula: (1−an average transmittance of the wavelength ranging from 316 nm to 380 nm)×100%. Furthermore, a blocking rate for UV-B (the UV lights with a wavelength ranging from 280 nm to 315 nm) of the 2nd comparative example and the 4th example can be calculated by the following formula: (1−an average transmittance of the wavelength ranging from 280 nm to 315 nm)×100%. The calculated results are listed in Table 12B.

TABLE 12B

| | 2nd comparative example | 4th example |
|---|---|---|
| blocking rate for UV-A (%) (316 nm-380 nm) | 6.44 | 79.32 |
| blocking rate for UV-B (%) (280 nm-315 nm) | 8.76 | 98.39 |

As shown in Table 12B, comparing to the 2nd comparative example, the blocking rate for UV-A and the blocking rate for UV-B of the 4th example is much greater than that of the 2nd comparative example. In other words, the multifocal contact lens of the 4th example can effectively block the UV lights, so that the probability that the retina hurt by the UV lights can be reduced.

5th Example

In the 5th example, a multifocal contact lens includes a central region, a first annular region and a second annular region. The central region, the second annular region and the first annular region are sequentially connected from a center of the multifocal contact lens to a periphery of the multifocal contact lens and are concentric. At least one of the central region, the second annular region, and the first annular region is aspheric. The structure of the multifocal contact lens of the 5th example can refer to FIG. 3.

In the multifocal contact lens of the 5th example, a diameter of the central region of the multifocal contact lens is DiC, an outer diameter of the first annular region of the multifocal contact lens is DiP1, an outer diameter of the second annular region of the multifocal contact lens is DiP2, a diopter of the central region of the multifocal contact lens is PowC, a maximal diopter of the first annular region of the multifocal contact lens is PowP1, a maximal diopter of the second annular region of the multifocal contact lens is PowP2, the value of DiC, DiP1, DiP2, DiC/DiP1, DiC/DiP2, PowC, PowP1, PowP2, |PowC−PowP1| of the 5th example are listed in Table 13.

TABLE 13

| | 5th example | | |
|---|---|---|---|
| DiC (mm) | 8.00 | PowC (D) | −2.00 |
| DiP1 (mm) | 15.00 | PowP1 (D) | 0 |
| DiP2 (mm) | 11.00 | PowP2 (D) | 0 |
| DiC/DiP1 | 0.53 | |PowC − PowP1| (D) | 2.00 |
| DiC/DiP2 | 0.73 | | |

Figure 11:
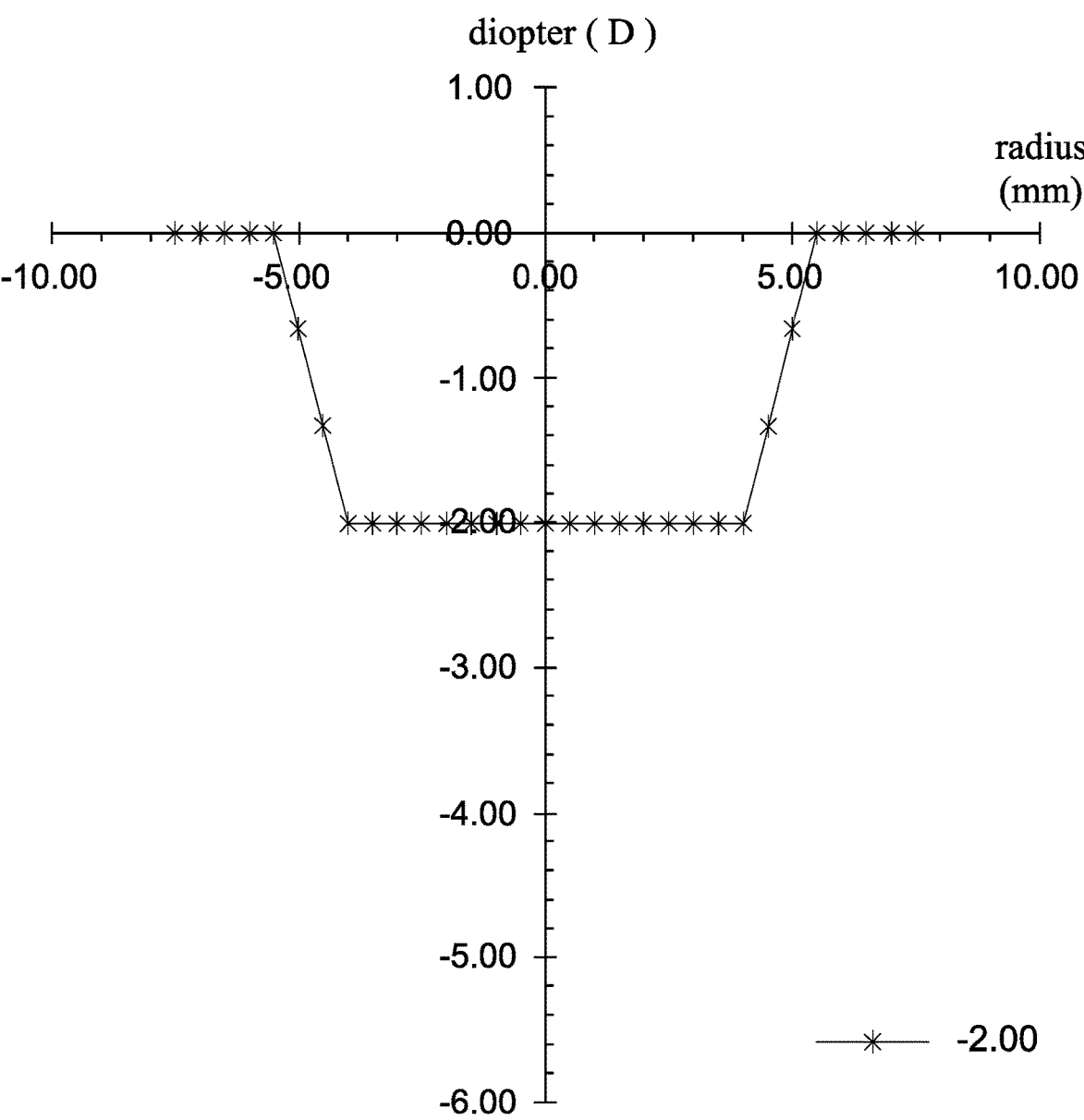
FIG. 11 shows a relationship between a radius and a diopter of a multifocal contact lens of the 5th example.

Please refer to Table 14 and FIG. 11 simultaneously, radiuses and the correspondent diopters of the multifocal contact lens of the 5th example are listed in Table 14. FIG. 11 shows a relationship between the radius and the diopter of the multifocal contact lens of the 5th example (the negative radius having an opposite direction with the positive radius). As shown in Table 14 and FIG. 11, the diopter of the central region is fixed, the diopter of the second annular region is different from the diopter of the central region, and the diopter of the first annular region is different from the diopter of the central region. Specifically, the diopter of the second annular region is greater than the diopter of the central region, the diopter of the second annular region increases when away from the central region, the diopter of the first annular region is greater than the diopter of the central region, and the diopter of the first annular region is fixed.

TABLE 14

| | 5th example | | |
|---|---|---|---|
| radius (mm) | diopter (D) | radius (mm) | diopter (D) |
| −7.50 | 0.00 | 0.50 | −2.00 |
| −7.00 | 0.00 | 1.00 | −2.00 |
| −6.50 | 0.00 | 1.50 | −2.00 |
| −6.00 | 0.00 | 2.00 | −2.00 |
| −5.50 | 0.00 | 2.50 | −2.00 |
| −5.00 | −0.67 | 3.00 | −2.00 |
| −4.50 | −1.33 | 3.50 | −2.00 |
| −4.00 | −2.00 | 4.00 | −2.00 |
| −3.50 | −2.00 | 4.50 | −1.33 |

TABLE 14-continued

| | 5th example | | |
|---|---|---|---|
| radius (mm) | diopter (D) | radius (mm) | diopter (D) |
| −3.00 | −2.00 | 5.00 | −0.67 |
| −2.50 | −2.00 | 5.50 | 0.00 |
| −2.00 | −2.00 | 6.00 | 0.00 |
| −1.50 | −2.00 | 6.50 | 0.00 |
| −1.00 | −2.00 | 7.00 | 0.00 |
| −0.50 | −2.00 | 7.50 | 0.00 |
| 0.00 | −2.00 | | |

In the 5th example, the multifocal contact lens is made of hydrogel. A composition for manufacturing the hydrogel of the 5th example is listed in Table 15.

TABLE 15

| Ingredient | Content (wt %) |
|---|---|
| 2-hydroxyethyl methacrylate | 45 |
| 2-(4-benzoyl-3-hydroxyphenoxy)ethyl acrylate | 0.9 |
| ethylene glycol dimethacrylate | 0.6 |
| 2-hydroxy-2-methyl-propiophenone | 0.6 |
| glycerol | 10.6 |
| 1,1,1-trimethylol propane trimethacrylate | 0.3 |
| glycerol monomethacrylate | 42 |

As shown in Table 15, the multifocal contact lens of the 5th example can effectively block the UV lights by adding 2-(4-benzoyl-3-hydroxyphenoxy)ethyl acrylate.

6th Example

In the 6th example, a multifocal contact lens includes a central region and a first annular region. The first annular region concentrically surrounds the central region. At least one of the central region and the first annular region is aspheric. The structure of the multifocal contact lens of the 6th example can refer to FIG. 2.

In the multifocal contact lens of the 6th example, a diameter of the central region of the multifocal contact lens is DiC, an outer diameter of the first annular region of the multifocal contact lens is DiP1, a diopter of the central region of the multifocal contact lens is PowC, a maximal diopter of the first annular region of the multifocal contact lens is PowP1, the value of DiC, DiP1, DiC/DiP1, PowC, PowP1, |PowC−PowP1| of the 6th example are listed in Table 16.

TABLE 16

| | 6th example | | |
|---|---|---|---|
| DiC (mm) | 9.00 | PowC (D) | −2.50 |
| DiP1 (mm) | 14.00 | PowP1 (D) | −2.25 |
| DiC/DiP1 | 0.64 | |PowC − PowP1| (D) | 0.25 |

Figure 12:
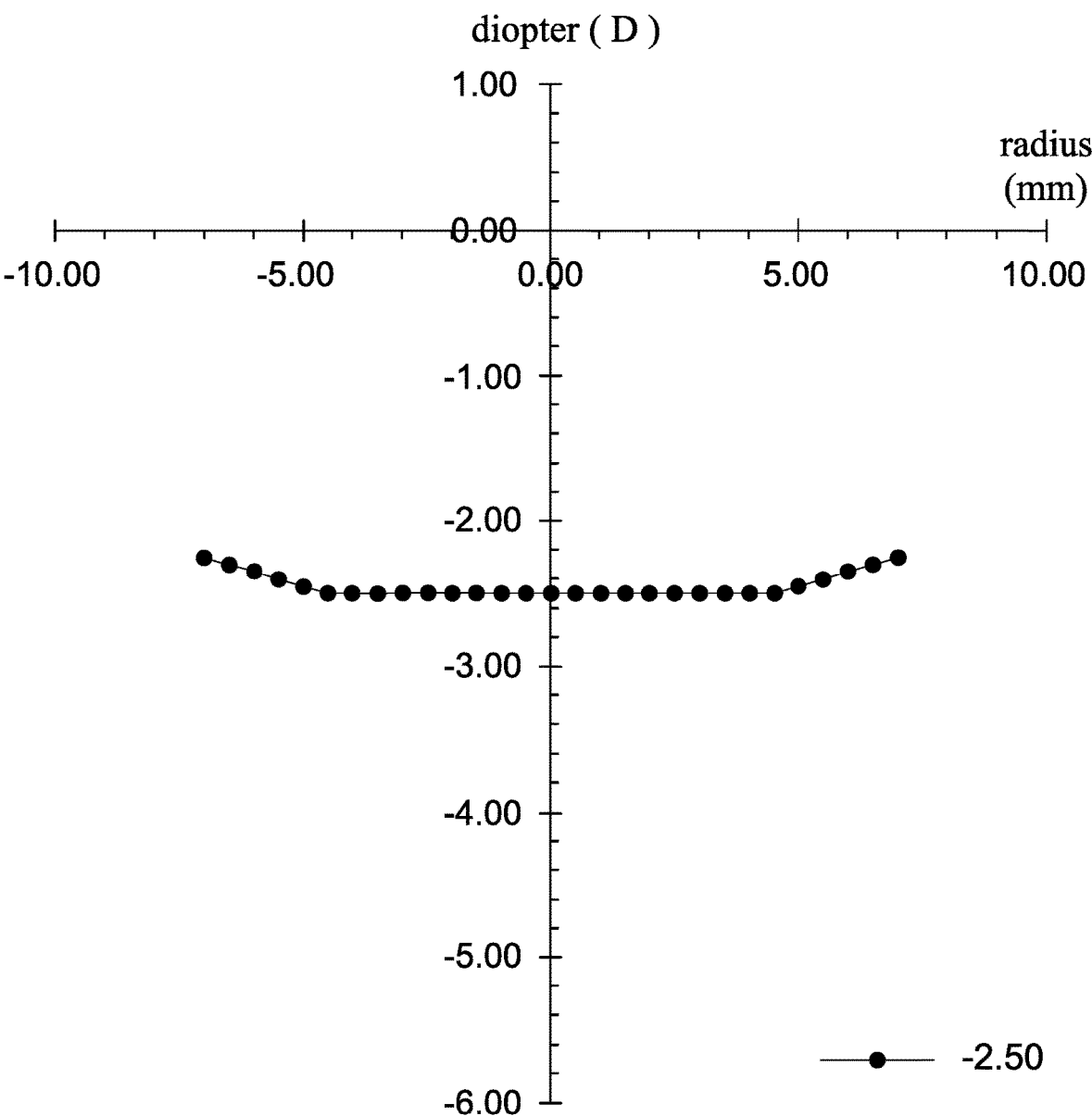
FIG. 12 shows a relationship between a radius and a diopter of a multifocal contact lens of the 6th example.

Please refer to Table 17 and FIG. 12 simultaneously, radiuses and the correspondent diopters of the multifocal contact lens of the 6th example are listed in Table 17. FIG. 12 shows a relationship between the radius and the diopter of the multifocal contact lens of the 6th example (the negative radius having an opposite direction with the positive radius). As shown in Table 17 and FIG. 12, the diopter of the central region is fixed, and the diopter of the first annular region is different from the diopter of the central region. Specifically, the diopter of the first annular region is greater than the diopter of the central region, and the diopter of the first annular region increases when away from the central region.

TABLE 17

| 6th example | | | |
|---|---|---|---|
| radius (mm) | diopter (D) | radius (mm) | diopter (D) |
| −7.00 | −2.25 | 0.50 | −2.50 |
| −6.50 | −2.30 | 1.00 | −2.50 |
| −6.00 | −2.35 | 1.50 | −2.50 |
| −5.50 | −2.40 | 2.00 | −2.50 |
| −5.00 | −2.45 | 2.50 | −2.50 |
| −4.50 | −2.50 | 3.00 | −2.50 |
| −4.00 | −2.50 | 3.50 | −2.50 |
| −3.50 | −2.50 | 4.00 | −2.50 |
| −3.00 | −2.50 | 4.50 | −2.50 |
| −2.50 | −2.50 | 5.00 | −2.45 |
| −2.00 | −2.50 | 5.50 | −2.40 |
| −1.50 | −2.50 | 6.00 | −2.35 |
| −1.00 | −2.50 | 6.50 | −2.30 |
| −0.50 | −2.50 | 7.00 | −2.25 |
| 0.00 | −2.50 | | |

In the 6th example, the multifocal contact lens is made of hydrogel. A composition for manufacturing the hydrogel of the 6th example is listed in Table 18.

TABLE 18

| Ingredient | Content (wt %) |
|---|---|
| 2-hydroxyethyl methacrylate | 90.4 |
| 2-(4-benzoyl-3-hydroxyphenoxy)ethyl acrylate | 1.2 |
| ethylene glycol dimethacrylate | 0.6 |
| 2-hydroxy-2-methyl-propiophenone | 0.7 |
| glycerol | 6.3 |
| N-vinyl-2-pyrrolidinone | 0.8 |

As shown in Table 18, the multifocal contact lens of the 6th example can effectively block the UV lights by adding 2-(4-benzoyl-3-hydroxyphenoxy)ethyl acrylate.

7th Example

In the 7th example, a multifocal contact lens includes a central region, a first annular region and a second annular region. The central region, the second annular region and the first annular region are sequentially connected from a center of the multifocal contact lens to a periphery of the multifocal contact lens and are concentric. At least one of the central region, the second annular region, and the first annular region is aspheric. The structure of the multifocal contact lens of the 7th example can refer to FIG. 3.

In the multifocal contact lens of the 7th example, a diameter of the central region of the multifocal contact lens is DiC, an outer diameter of the first annular region of the multifocal contact lens is DiP1, an outer diameter of the second annular region of the multifocal contact lens is DiP2, a diopter of the central region of the multifocal contact lens is PowC, a maximal diopter of the first annular region of the multifocal contact lens is PowP1, a maximal diopter of the second annular region of the multifocal contact lens is PowP2, the value of DiC, DiP1, DiP2, DiC/DiP1, DiC/DiP2, PowC, PowP1, PowP2, |PowC−PowP1| of the 7th example are listed in Table 19.

TABLE 19

| 7th example | | | |
|---|---|---|---|
| DiC (mm) | 4.00 | PowC (D) | −3.00 |
| DiP1 (mm) | 15.00 | PowP1 (D) | −1.00 |
| DiP2 (mm) | 8.00 | PowP2 (D) | −2.00 |
| DiC/DiP1 | 0.27 | \|PowC − PowP1\| (D) | 2.00 |
| DiC/DiP2 | 0.50 | | |

Figure 13:
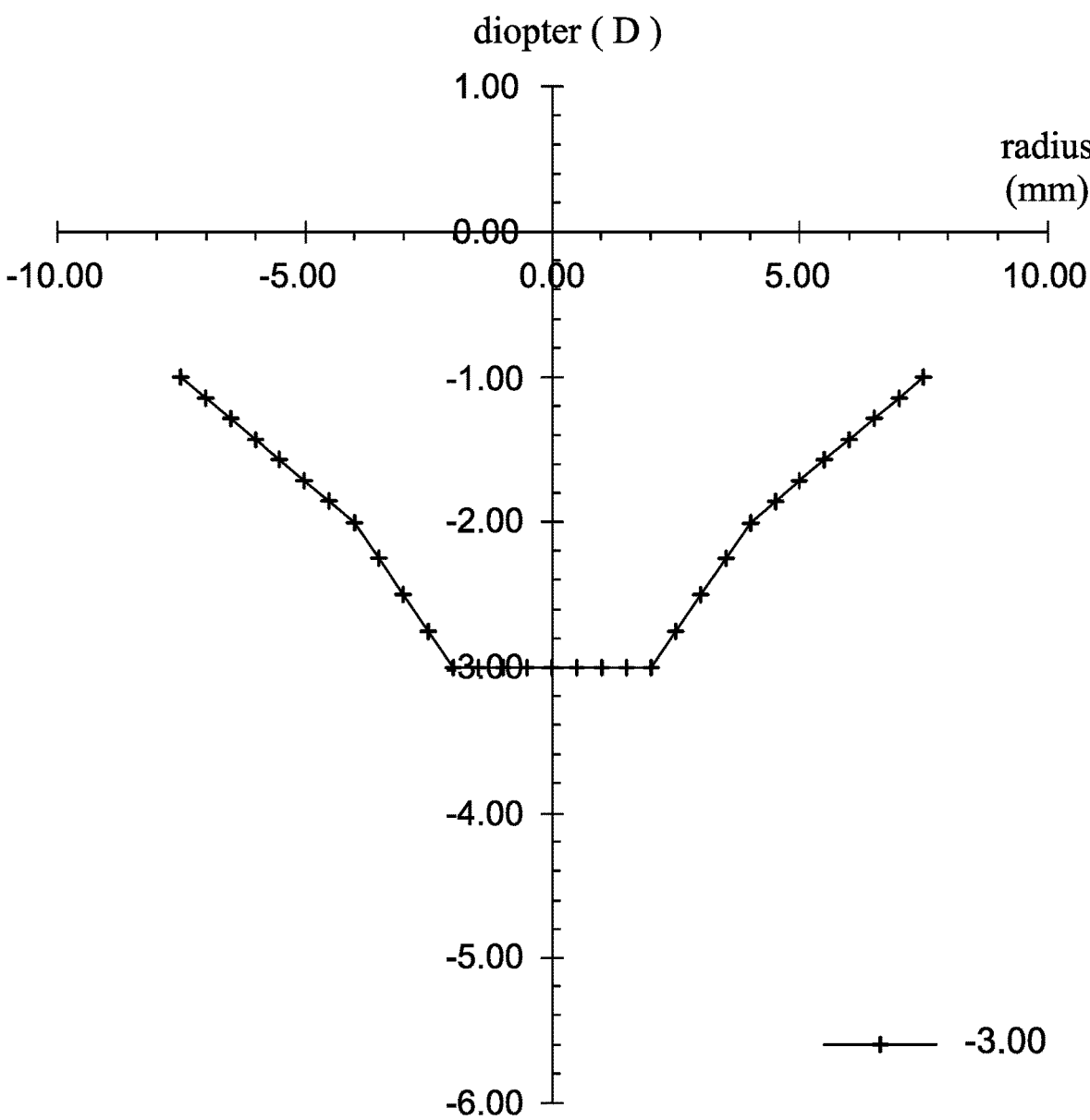
FIG. 13 shows a relationship between a radius and a diopter of a multifocal contact lens of the 7th example.

Please refer to Table 20 and FIG. 13 simultaneously, radiuses and the correspondent diopters of the multifocal contact lens of the 7th example are listed in Table 20. FIG. 13 shows a relationship between the radius and the diopter of the multifocal contact lens of the 7th example (the negative radius having an opposite direction with the positive radius). As shown in Table 20 and FIG. 13, the diopter of the central region is fixed, the diopter of the second annular region is different from the diopter of the central region, and the diopter of the first annular region is different from the diopter of the central region. Specifically, the diopter of the second annular region is greater than the diopter of the central region, the diopter of the second annular region increases when away from the central region, the diopter of the first annular region is greater than the diopter of the central region, and the diopter of the first annular region increases when away from the central region.

TABLE 20

| 7th example | | | |
|---|---|---|---|
| radius (mm) | diopter (D) | radius (mm) | diopter (D) |
| −7.50 | −1.00 | 0.50 | −3.00 |
| −7.00 | −1.14 | 1.00 | −3.00 |
| −6.00 | −1.43 | 2.00 | −3.00 |
| −5.50 | −1.57 | 2.50 | −2.75 |
| −5.00 | −1.71 | 3.00 | −2.50 |
| −4.50 | −1.86 | 3.50 | −2.25 |
| −4.00 | −2.00 | 4.00 | −2.00 |
| −3.50 | −2.25 | 4.50 | −1.86 |
| −3.00 | −2.50 | 5.00 | −1.71 |
| −2.50 | −2.75 | 5.50 | −1.57 |
| −2.00 | −3.00 | 6.00 | −1.43 |
| −1.50 | −3.00 | 6.50 | −1.29 |
| −1.00 | −3.00 | 7.00 | −1.14 |
| −0.50 | −3.00 | 7.50 | −1.00 |
| 0.00 | −3.00 | | |

In the 7th example, the multifocal contact lens is made of hydrogel. A composition for manufacturing the hydrogel of the 7th example is listed in Table 21A.

TABLE 21A

| Ingredient | Content (wt %) |
|---|---|
| 2-hydroxyethyl methacrylate | 82 |
| 4-(phenyldiazenyl) phenyl methacrylate | 1 |
| ethylene glycol dimethacrylate | 0.4 |
| 2-hydroxy-2-methyl-propiophenone | 0.6 |
| glycerol | 13.5 |
| 1,1,1-trimethylol propane trimethacrylate | 0.2 |
| methacrylic acid | 2.3 |

As shown in Table 21A, the multifocal contact lens of the 7th example can effectively block the blue lights by adding 4-(phenyldiazenyl) phenyl methacrylate.

Figure 14:
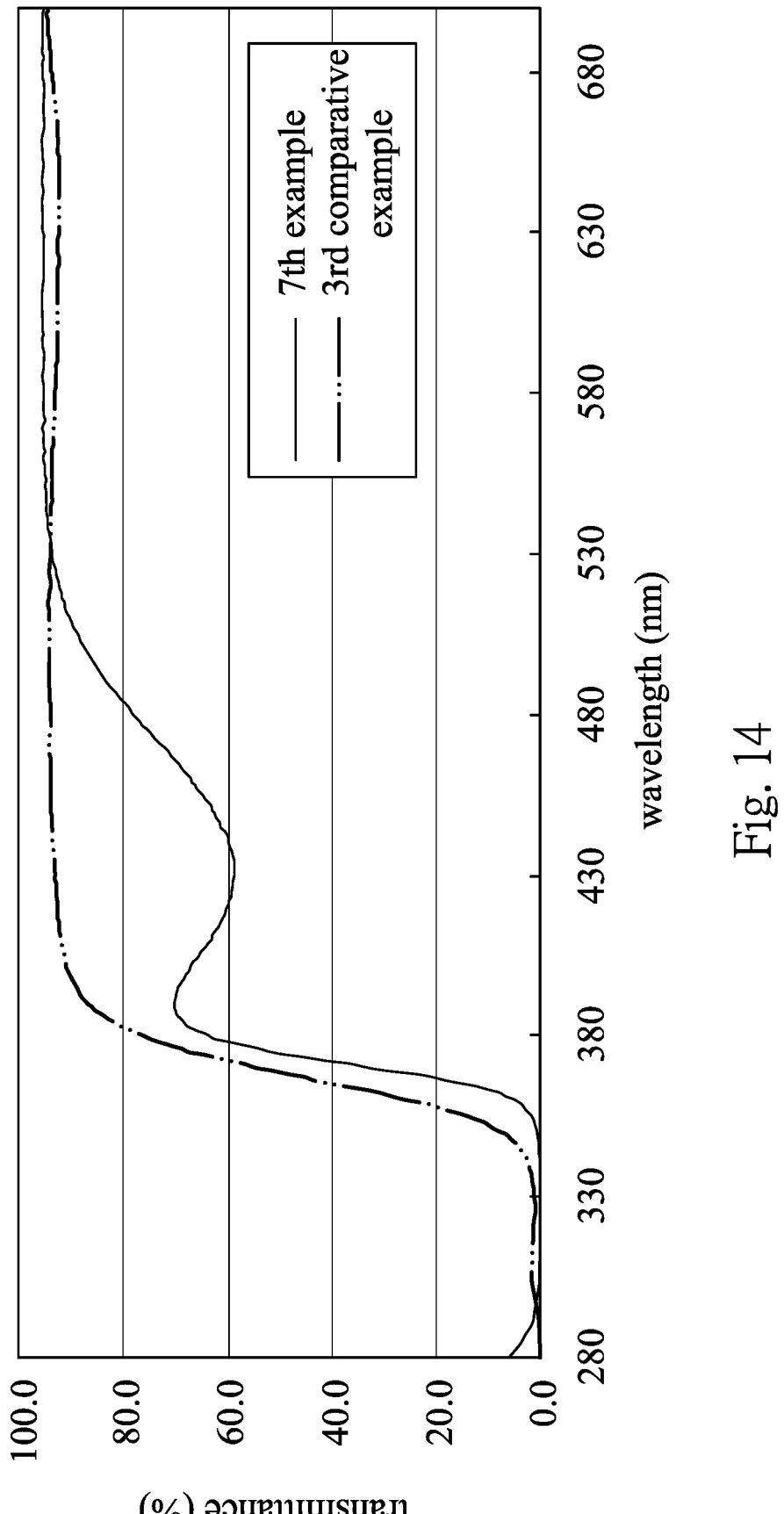
FIG. 14 shows a relationship between a wavelength and a transmittance of the multifocal contact lens of the 7th example and a multifocal contact lens of the 3rd comparative example.

FIG. 14 shows a relationship between a wavelength and a transmittance of the multifocal contact lens of the 7th example and a multifocal contact lens the 3rd comparative example. The difference between the 3rd comparative example and the 7th example is the 3rd comparative example in lack of blue-light blocking agent. Specifically, a composition of the 3rd comparative example is formulated by replacing the 4-(phenyldiazenyl) phenyl methacrylate in the 7th example with the 2-hydroxyethyl methacrylate. In FIG. 14, a blocking rate for blue lights (with a wavelength ranging from 380 nm to 495 nm) of the 3rd comparative example and the 7th example can be calculated by the following formula: (1−an average transmittance of the wavelength ranging from 380 nm to 495 nm)×100%. The calculated results are listed in Table 21B.

TABLE 21B

|  | 3rd comparative example | 7th example |
|---|---|---|
| blocking rate for blue lights (%) (380 nm-495 nm) | 8.21 | 35.53 |

As shown in Table 21B, comparing to the 3rd comparative example, the blocking rate for blue lights of the 7th example is much greater than that of the 3rd comparative example. In other words, the multifocal contact lens of the 7th example can effectively block the blue lights, so that the probability that the retina hurt by the blue lights can be reduced.

8th Example

In the 8th example, a multifocal contact lens includes a central region and a first annular region. The first annular region concentrically surrounds the central region. At least one of the central region and the first annular region is aspheric. The structure of the multifocal contact lens of the 8th example can refer to FIG. 2.

In the multifocal contact lens of the 8th example, a diameter of the central region of the multifocal contact lens is DiC, an outer diameter of the first annular region of the multifocal contact lens is DiP1, a diopter of the central region of the multifocal contact lens is PowC, a maximal diopter of the first annular region of the multifocal contact lens is PowP1, the value of DiC, DiP1, DiC/DiP1, PowC, PowP1, |PowC−PowP1| of the 8th example are listed in Table 22.

TABLE 22

| 8th example | | | |
|---|---|---|---|
| DiC (mm) | 5.00 | PowC (D) | −3.50 |
| DiP1 (mm) | 10.00 | PowP1 (D) | −1.75 |
| DiC/DiP1 | 0.50 | \|PowC − PowP1\| (D) | 1.75 |

Figure 15:
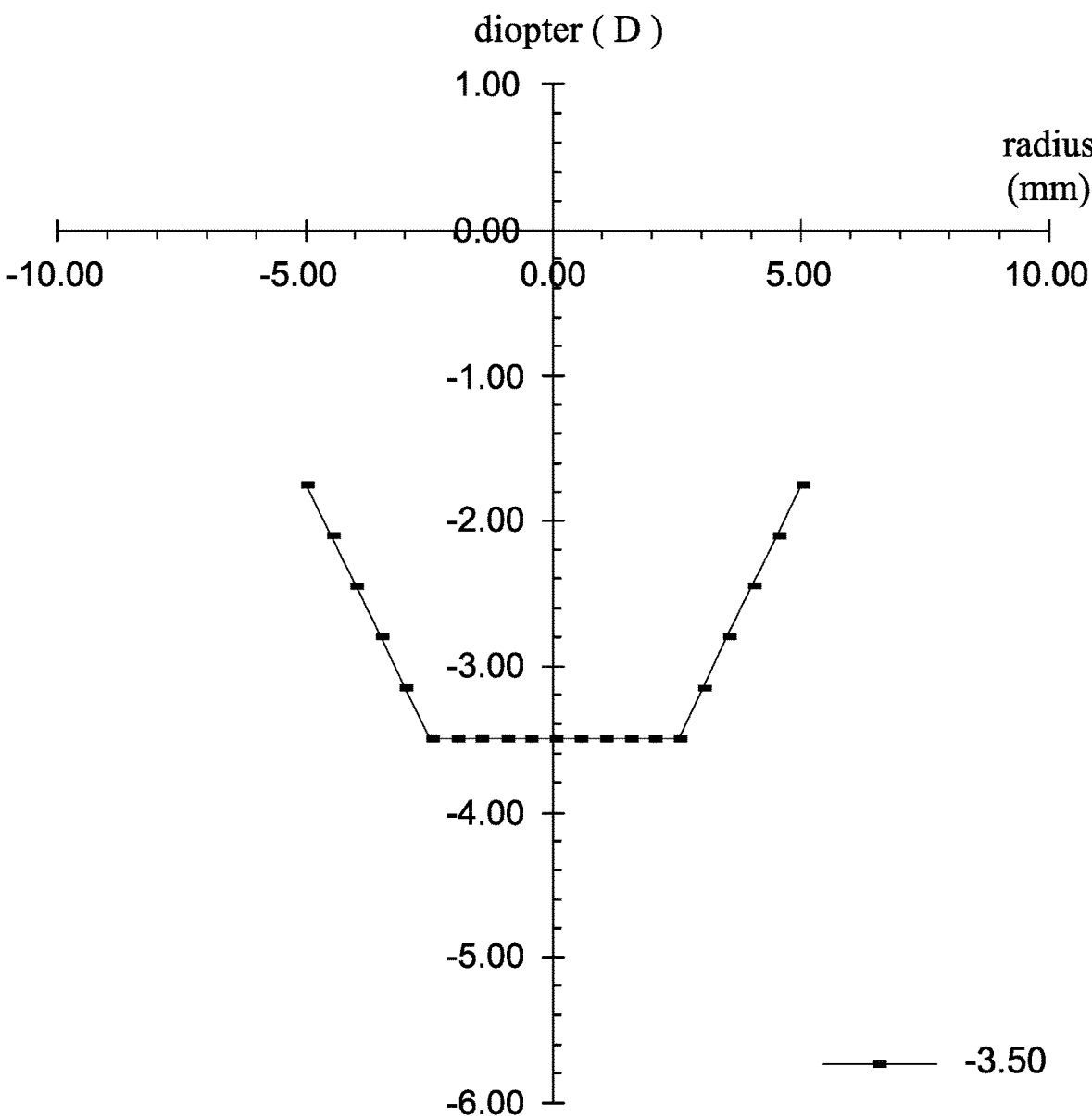
FIG. 15 shows a relationship between a radius and a diopter of a multifocal contact lens of the 8th example.

Please refer to Table 23 and FIG. 15 simultaneously, radiuses and the correspondent diopters of the multifocal contact lens of the 8th example are listed in Table 23. FIG. 15 shows a relationship between the radius and the diopter of the multifocal contact lens of the 8th example (the negative radius having an opposite direction with the positive radius). As shown in Table 23 and FIG. 15, the diopter of the central region is fixed, and the diopter of the first annular region is different from the diopter of the central region. Specifically, the diopter of the first annular region is greater than the diopter of the central region, and the diopter of the first annular region increases when away from the central region.

TABLE 23

| 8th example | | | |
|---|---|---|---|
| radius (mm) | diopter (D) | radius (mm) | diopter (D) |
| −5.00 | −1.75 | 0.50 | −3.50 |
| −4.50 | −2.10 | 1.00 | −3.50 |
| −4.00 | −2.45 | 1.50 | −3.50 |
| −3.50 | −2.80 | 2.00 | −3.50 |
| −3.00 | −3.15 | 2.50 | −3.50 |
| −2.50 | −3.50 | 3.00 | −3.15 |
| −2.00 | −3.50 | 3.50 | −2.80 |
| −1.50 | −3.50 | 4.00 | −2.45 |
| −1.00 | −3.50 | 4.50 | −2.10 |
| −0.50 | −3.50 | 5.00 | −1.75 |
| 0.00 | −3.50 | | |

In the 8th example, the multifocal contact lens is made of hydrogel. A composition for manufacturing the hydrogel of the 8th example is listed in Table 24.

TABLE 24

| Ingredient | Content (wt %) |
|---|---|
| 2-hydroxyethyl methacrylate | 45 |
| 4-(phenyldiazenyl) phenyl methacrylate | 1 |
| ethylene glycol dimethacrylate | 0.5 |
| 2-hydroxy-2-methyl-propiophenone | 0.6 |
| glycerol | 10.6 |
| 1,1,1-trimethylol propane trimethacrylate | 0.3 |
| glycerol monomethacrylate | 42 |

As shown in Table 24, the multifocal contact lens of the 8th example can effectively block the blue lights by adding 4-(phenyldiazenyl) phenyl methacrylate.

9th Example

In the 9th example, a multifocal contact lens includes a central region, a first annular region and a second annular region. The central region, the second annular region and the first annular region are sequentially connected from a center of the multifocal contact lens to a periphery of the multifocal contact lens and are concentric. At least one of the central region, the second annular region, and the first annular region is aspheric. The structure of the multifocal contact lens of the 9th example can refer to FIG. 3.

In the multifocal contact lens of the 9th example, a diameter of the central region of the multifocal contact lens is DiC, an outer diameter of the first annular region of the multifocal contact lens is DiP1, an outer diameter of the second annular region of the multifocal contact lens is DiP2, a diopter of the central region of the multifocal contact lens is PowC, a maximal diopter of the first annular region of the multifocal contact lens is PowP1, a maximal diopter of the second annular region of the multifocal contact lens is PowP2, the value of DiC, DiP1, DiP2, DiC/DiP1, DiC/DiP2, PowC, PowP1, PowP2, |PowC−PowP1| of the 9th example are listed in Table 25.

TABLE 25

| 9th example | | | |
|---|---|---|---|
| DiC (mm) | 6.00 | PowC (D) | −4.00 |
| DiP1 (mm) | 14.00 | PowP1 (D) | −3.25 |
| DiP2 (mm) | 10.00 | PowP2 (D) | −3.75 |
| DiC/DiP1 | 0.43 | \|PowC-PowP1\| (D) | 0.75 |
| DiC/DiP2 | 0.60 | | |

23

Figure 16:
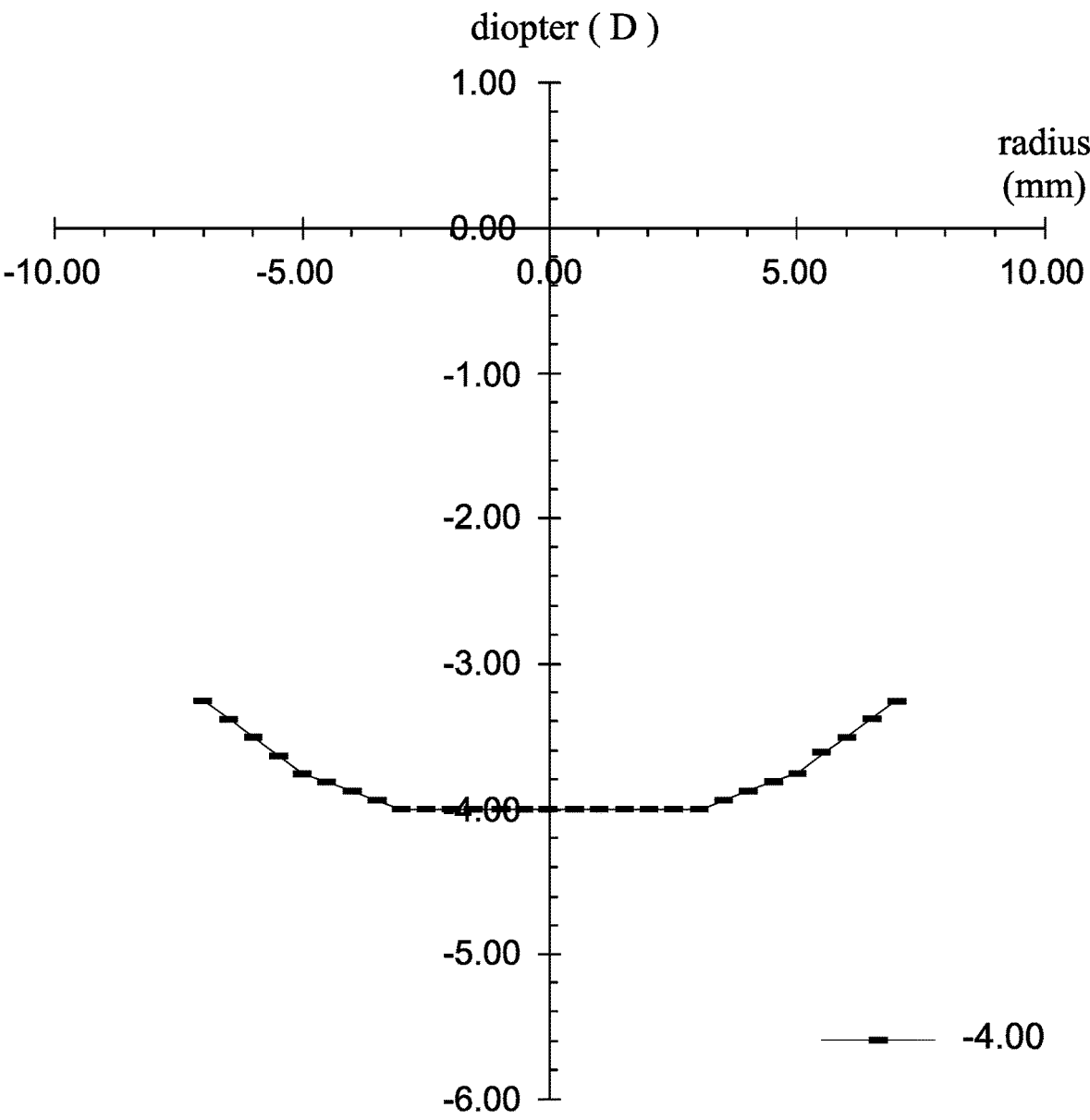
FIG. 16 shows a relationship between a radius and a diopter of a multifocal contact lens of the 9th example.

Please refer to Table 26 and FIG. 16 simultaneously, radiuses and the correspondent diopters of the multifocal contact lens of the 9th example are listed in Table 26. FIG. 16 shows a relationship between the radius and the diopter of the multifocal contact lens of the 9th example (the negative radius having an opposite direction with the positive radius). As shown in Table 26 and FIG. 16, the diopter of the central region is fixed, the diopter of the second annular region is different from the diopter of the central region, and the diopter of the first annular region is different from the diopter of the central region. Specifically, the diopter of the second annular region is greater than the diopter of the central region, the diopter of the second annular region increases when away from the central region, the diopter of the first annular region is greater than the diopter of the central region, and the diopter of the first annular region increases when away from the central region.

TABLE 26

| 9th example | | | |
| --- | --- | --- | --- |
| radius (mm) | diopter (D) | radius (mm) | diopter (D) |
| −7.00 | −3.25 | 0.50 | −4.00 |
| −6.50 | −3.38 | 1.00 | −4.00 |
| −6.00 | −3.50 | 1.50 | −4.00 |
| −5.50 | −3.63 | 2.00 | −4.00 |
| −5.00 | −3.75 | 2.50 | −4.00 |
| −4.50 | −3.81 | 3.00 | −4.00 |
| −4.00 | −3.88 | 3.50 | −3.94 |
| −3.50 | −3.94 | 4.00 | −3.88 |
| −3.00 | −4.00 | 4.50 | −3.81 |
| −2.50 | −4.00 | 5.00 | −3.75 |
| −2.00 | −4.00 | 5.50 | −3.63 |
| −1.50 | −4.00 | 6.00 | −3.50 |
| −1.00 | −4.00 | 6.50 | −3.38 |
| −0.50 | −4.00 | 7.00 | −3.25 |
| 0.00 | −4.00 | | |

In the 9th example, the multifocal contact lens is made of hydrogel. A composition for manufacturing the hydrogel of the 9th example is listed in Table 27.

TABLE 27

| Ingredient | Content (wt %) |
| --- | --- |
| 2-hydroxyethyl methacrylate | 90.3 |
| 4-(phenyldiazenyl) phenyl methacrylate | 1.2 |
| ethylene glycol dimethacrylate | 0.6 |
| 2-hydroxy-2-methyl-propiophenone | 0.6 |
| glycerol | 6.5 |
| N-vinyl-2-pyrrolidinone | 0.8 |

As shown in Table 27, the multifocal contact lens of the 9th example can effectively block the blue lights by adding 4-(phenyldiazenyl) phenyl methacrylate.

10th Example

In the 10th example, a multifocal contact lens includes a central region and a first annular region. The first annular region concentrically surrounds the central region. At least one of the central region and the first annular region is aspheric. The structure of the multifocal contact lens of the 10th example can refer to FIG. 2.

In the multifocal contact lens of the 10th example, a diameter of the central region of the multifocal contact lens is DiC, an outer diameter of the first annular region of the multifocal contact lens is DiP1, a diopter of the central region of the multifocal contact lens is PowC, a maximal diopter of the first annular region of the multifocal contact lens is PowP1, the value of DiC, DiP1, DiC/DiP1, PowC, PowP1, |PowC−PowP1| of the 10th example are listed in Table 28.

TABLE 28

| 10th example | | | |
| --- | --- | --- | --- |
| DiC (mm) | 7.00 | PowC (D) | −4.50 |
| DiP1 (mm) | 12.00 | PowP1 (D) | −3.00 |
| DiC/DiP1 | 0.58 | |PowC-PowP1| (D) | 1.50 |

Figure 17:
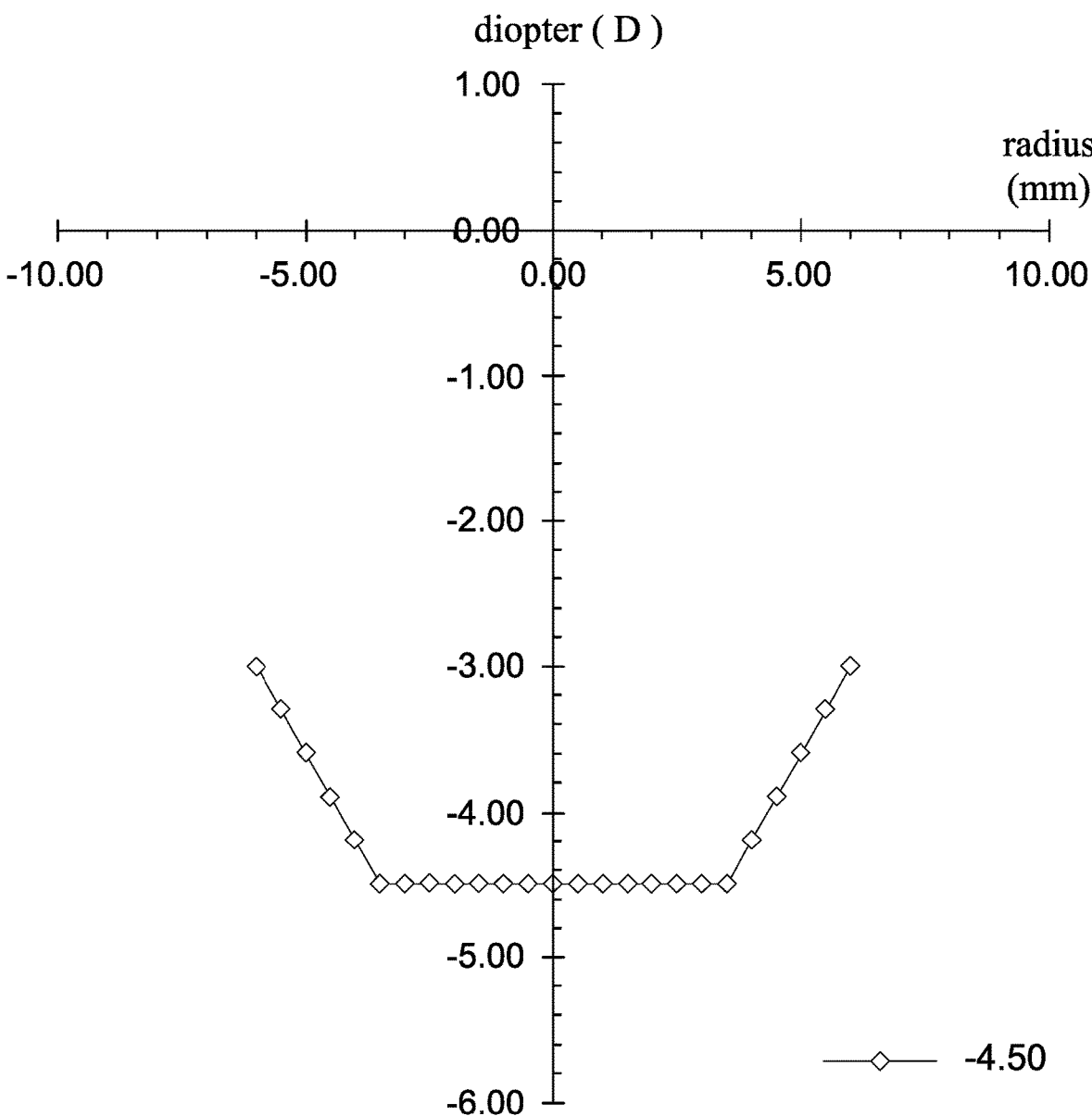
FIG. 17 shows a relationship between a radius and a diopter of a multifocal contact lens of the 10th example.

Please refer to Table 29 and FIG. 17 simultaneously, radiuses and the correspondent diopters of the multifocal contact lens of the 10th example are listed in Table 29. FIG. 17 shows a relationship between the radius and the diopter of the multifocal contact lens of the 10th example (the negative radius having an opposite direction with the positive radius). As shown in Table 29 and FIG. 17, the diopter of the central region is fixed, and the diopter of the first annular region is different from the diopter of the central region. Specifically, the diopter of the first annular region is greater than the diopter of the central region, and the diopter of the first annular region increases when away from the central region.

TABLE 29

| 10th example | | | |
| --- | --- | --- | --- |
| radius (mm) | diopter (D) | radius (mm) | diopter (D) |
| −6.00 | −3.00 | 0.50 | −4.50 |
| −5.50 | −3.30 | 1.00 | −4.50 |
| −5.00 | −3.60 | 1.50 | −4.50 |
| −4.50 | −3.90 | 2.00 | −4.50 |
| −4.00 | −4.20 | 2.50 | −4.50 |
| −3.50 | −4.50 | 3.00 | −4.50 |
| −3.00 | −4.50 | 3.50 | −4.50 |
| −2.50 | −4.50 | 4.00 | −4.20 |
| −2.00 | −4.50 | 4.50 | −3.90 |
| −1.50 | −4.50 | 5.00 | −3.60 |
| −1.00 | −4.50 | 5.50 | −3.30 |
| −0.50 | −4.50 | 6.00 | −3.00 |
| 0.00 | −4.50 | | |

In the 10th example, the multifocal contact lens is made of silicone hydrogel. A composition for manufacturing the silicone hydrogel of the 10th example is listed in Table 30.

TABLE 30

| Ingredient | Content (wt %) |
| --- | --- |
| 2-hydroxyethyl methacrylate | 4.3 |
| 3-methacryloyloxypropyltris(trimethylsilyloxy)silane | 28 |
| 2-hydroxy-2-methyl-propiophenone | 0.6 |
| N-vinyl-2-pyrrolidinone | 20.2 |
| N,N-dimethyl acrylamide | 12.3 |
| ethylene glycol dimethacrylate | 0.6 |
| 2-(4-benzoyl-3-hydroxyphenoxy)ethyl acrylate | 1 |
| 3-(3-methacryloxy-2-hydroxypropoxy) propylbis(trimethylsiloxy)meth-ylsilane | 21.5 |
| isopropyl alcohol | 10 |
| methacrylic acid | 1.5 |

As shown in Table 30, the multifocal contact lens of the 10th example can effectively block the UV lights by adding 2-(4-benzoyl-3-hydroxyphenoxy)ethyl acrylate.

11th Example

In the 11th example, a multifocal contact lens includes a central region, a first annular region and a second annular region. The central region, the second annular region and the first annular region are sequentially connected from a center of the multifocal contact lens to a periphery of the multifocal contact lens and are concentric. At least one of the central region, the second annular region, and the first annular region is aspheric. The structure of the multifocal contact lens of the 11th example can refer to FIG. 3.

In the multifocal contact lens of the 11th example, a diameter of the central region of the multifocal contact lens is DiC, an outer diameter of the first annular region of the multifocal contact lens is DiP1, an outer diameter of the second annular region of the multifocal contact lens is DiP2, a diopter of the central region of the multifocal contact lens is PowC, a maximal diopter of the first annular region of the multifocal contact lens is PowP1, a maximal diopter of the second annular region of the multifocal contact lens is PowP2, the value of DiC, DiP1, DiP2, DiC/DiP1, DiC/DiP2, PowC, PowP1, PowP2, |PowC−PowP1| of the 11th example are listed in Table 31.

TABLE 31

11th example

| DiC (mm) | 8.00 | PowC (D) | −5.00 |
|---|---|---|---|
| DiP1 (mm) | 13.00 | PowP1 (D) | −2.75 |
| DiP2 (mm) | 10.00 | PowP2 (D) | −4.00 |
| DiC/DiP1 | 0.62 | \|PowC-PowP1\| (D) | 2.25 |
| DiC/DiP2 | 0.80 | | |

Figure 18:
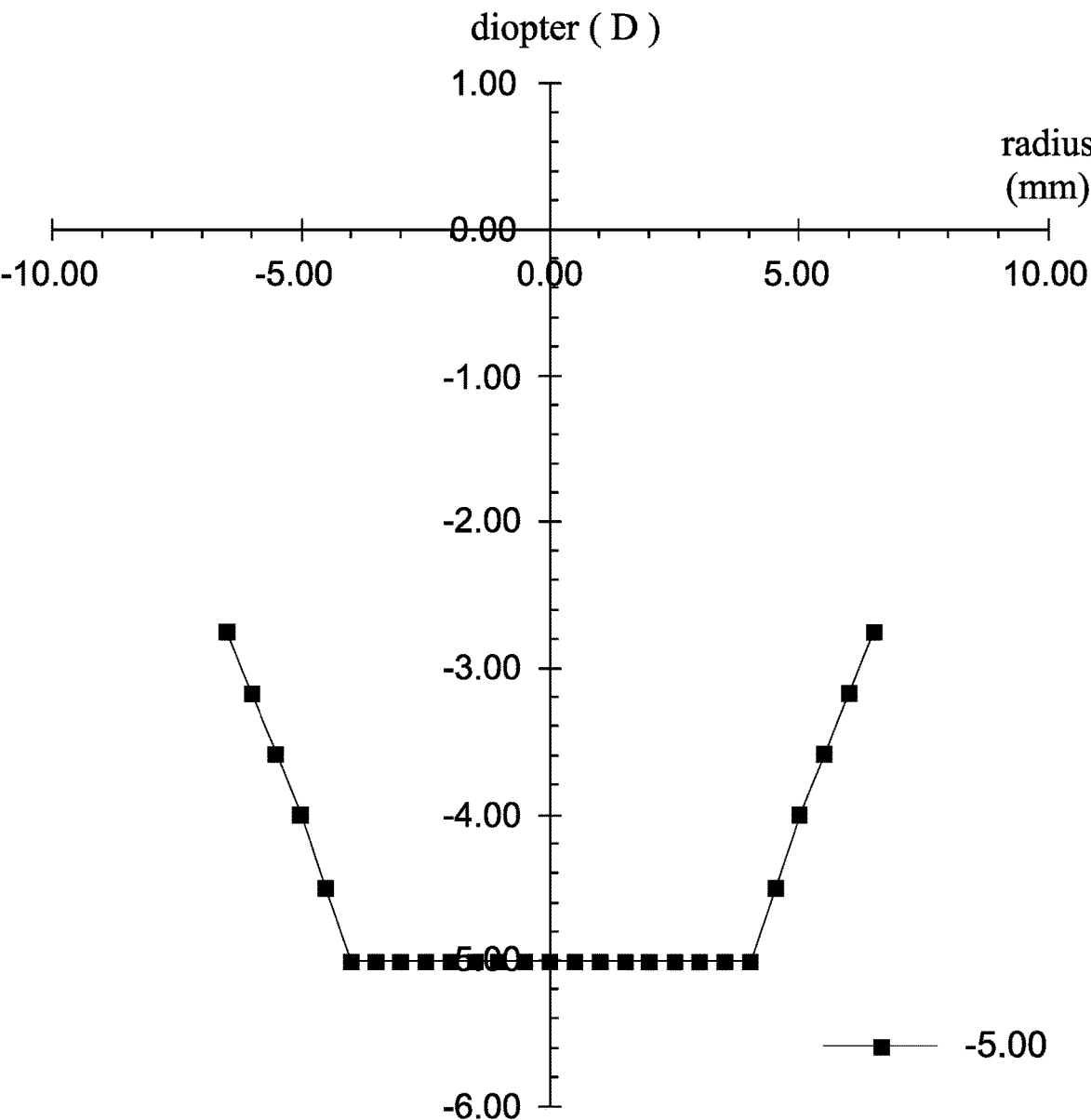
FIG. 18 shows a relationship between a radius and a diopter of a multifocal contact lens of the 11th example.

Please refer to Table 32 and FIG. 18 simultaneously, radiuses and the correspondent diopters of the multifocal contact lens of the 11th example are listed in Table 32. FIG. 18 shows a relationship between the radius and the diopter of the multifocal contact lens of the 11th example (the negative radius having an opposite direction with the positive radius). As shown in Table 32 and FIG. 18, the diopter of the central region is fixed, the diopter of the second annular region is different from the diopter of the central region, and the diopter of the first annular region is different from the diopter of the central region. Specifically, the diopter of the second annular region is greater than the diopter of the central region, the diopter of the second annular region increases when away from the central region, the diopter of the first annular region is greater than the diopter of the central region, and the diopter of the first annular region increases when away from the central region.

TABLE 32

11th example

| radius (mm) | diopter (D) | radius (mm) | diopter (D) |
|---|---|---|---|
| −6.50 | −2.75 | 0.50 | −5.00 |
| −6.00 | −3.17 | 1.00 | −5.00 |
| −5.50 | −3.58 | 1.50 | −5.00 |
| −5.00 | −4.00 | 2.00 | −5.00 |
| −4.50 | −4.50 | 2.50 | −5.00 |
| −4.00 | −5.00 | 3.00 | −5.00 |
| −3.50 | −5.00 | 3.50 | −5.00 |
| −3.00 | −5.00 | 4.00 | −5.00 |
| −2.50 | −5.00 | 4.50 | −4.50 |
| −2.00 | −5.00 | 5.00 | −4.00 |
| −1.50 | −5.00 | 5.50 | −3.58 |
| −1.00 | −5.00 | 6.00 | −3.17 |

TABLE 32-continued

11th example

| radius (mm) | diopter (D) | radius (mm) | diopter (D) |
|---|---|---|---|
| −0.50 | −5.00 | 6.50 | −2.75 |
| 0.00 | −5.00 | | |

In the 11th example, the multifocal contact lens is made of silicone hydrogel. A composition for manufacturing the silicone hydrogel of the 11th example is listed in Table 33A.

TABLE 33A

| Ingredient | Content (wt %) |
|---|---|
| 2-hydroxyethyl methacrylate | 4 |
| 3-methacryloyloxypropyltris(trimethylsilyloxy)silane | 28 |
| 2-hydroxy-2-methyl-propiophenone | 0.6 |
| N-vinyl-2-pyrrolidinone | 20.5 |
| N,N-dimethyl acrylamide | 12.3 |
| ethylene glycol dimethacrylate | 0.5 |
| 2-(4-benzoyl-3-hydroxyphenoxy)ethyl acrylate | 1.1 |
| (3-acryloxy-2-hydroxypropoxypropyl)terminated polydimethylsiloxane | 22 |
| 1-hexanol | 11 |

As shown in Table 33A, the multifocal contact lens of the 11th example can effectively block the UV lights by adding 2-(4-benzoyl-3-hydroxyphenoxy)ethyl acrylate.

Figure 19:
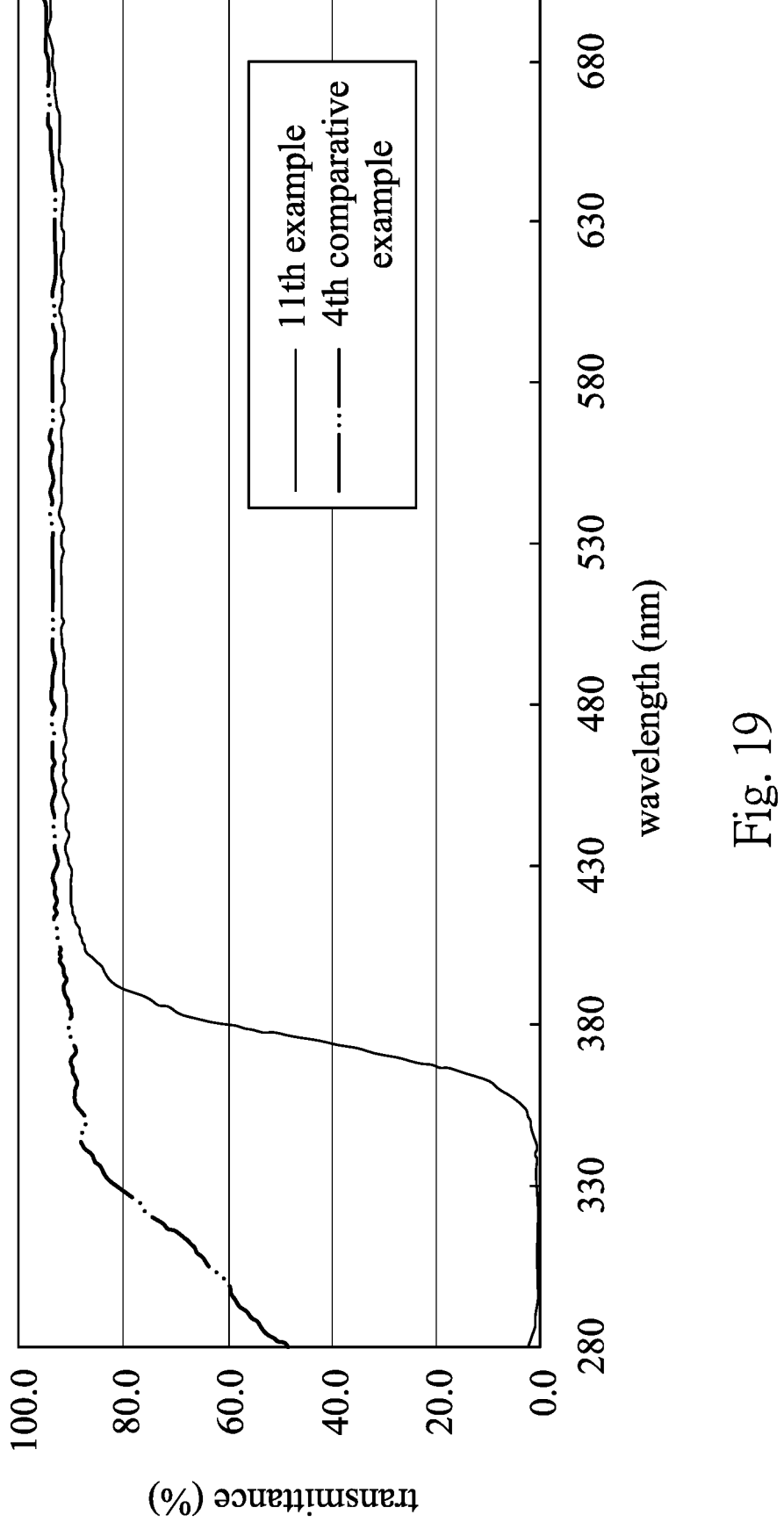
FIG. 19 shows a relationship between a wavelength and a transmittance of the multifocal contact lens of the 11th example and a multifocal contact lens of the 4th comparative example.

FIG. 19 shows a relationship between a wavelength and a transmittance of the multifocal contact lens of the 11th example and a multifocal contact lens the 4th comparative example. The difference between the 4th comparative example and the 11th example is the 4th comparative example in lack of UV blocking agent. Specifically, a composition of the 4th comparative example is formulated by replacing the 2-(4-benzoyl-3-hydroxyphenoxy)ethyl acrylate in the 11th example with the 2-hydroxyethyl methacrylate. In FIG. 19, a blocking rate for UV-A (the UV lights with a wavelength ranging from 316 nm to 380 nm) of the 4th comparative example and the 11th example can be calculated by the following formula: (1−an average transmittance of the wavelength ranging from 316 nm to 380 nm)×100%. Furthermore, a blocking rate for UV-B (the UV lights with a wavelength ranging from 280 nm to 315 nm) of the 4th comparative example and the 11th example can be calculated by the following formula: (1−an average transmittance of the wavelength ranging from 280 nm to 315 nm)×100%. The calculated results are listed in Table 33B.

TABLE 33B

| | 4th comparative example | 11th example |
|---|---|---|
| blocking rate for UV-A (%) (316 nm-380 nm) | 15.02 | 90.01 |
| blocking rate for UV-B (%) (280 nm-315 nm) | 40.91 | 99.24 |

As shown in Table 33B, comparing to the 4th comparative example, the blocking rate for UV-A and the blocking rate for UV-B of the 11th example is much greater than that of the 4th comparative example. In other words, the multifocal contact lens of the 11th example can effectively block the UV lights, so that the probability that the retina hurt by the UV lights can be reduced.

12th Example

In the 12th example, a multifocal contact lens includes a central region, a first annular region, a second annular region and a third annular region. The central region, the third annular region, the second annular region and the first annular region are sequentially connected from a center of the multifocal contact lens to a periphery of the multifocal contact lens and are concentric. At least one of the central region, the third annular region, the second annular region and the first annular region is aspheric. The structure of the multifocal contact lens of the 12th example can refer to FIG. 4.

In the multifocal contact lens of the 12th example, a diameter of the central region of the multifocal contact lens is DiC, an outer diameter of the first annular region of the multifocal contact lens is DiP1, an outer diameter of the second annular region of the multifocal contact lens is DiP2, an outer diameter of the third annular region of the multifocal contact lens is DiP3, a diopter of the central region of the multifocal contact lens is PowC, a maximal diopter of the first annular region of the multifocal contact lens is PowP1, a maximal diopter of the second annular region of the multifocal contact lens is PowP2, a maximal diopter of the third annular region of the multifocal contact lens is PowP3, the value of DiC, DiP1, DiP2, DiP3, DiC/DiP1, DiC/DiP2, PowC, PowP1, PowP2, PowP3, |PowC−PowP1| of the 12th example are listed in Table 34.

TABLE 34

| 12th example | | | |
|---|---|---|---|
| DiC (mm) | 4.00 | PowC (D) | −5.50 |
| DiP1 (mm) | 16.00 | PowP1 (D) | −3.00 |
| DiP2 (mm) | 12.00 | PowP2 (D) | −3.00 |
| DiP3 (mm) | 8.00 | PowP3 (D) | −3.75 |
| DiC/DiP1 | 0.25 | |PowC-PowP1| (D) | 2.50 |
| DiC/DiP2 | 0.33 | | |

Figure 20:
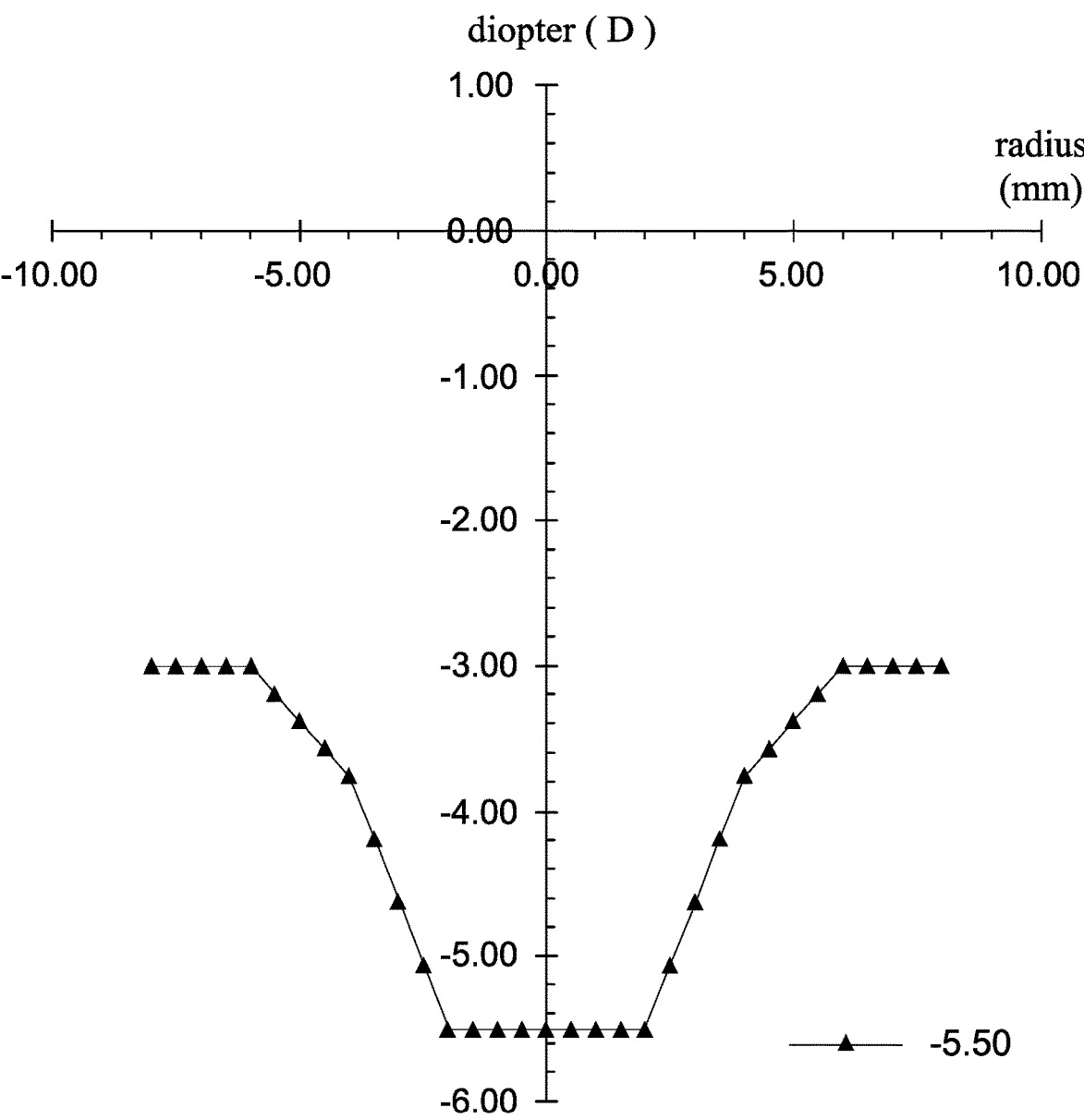
FIG. 20 shows a relationship between a radius and a diopter of a multifocal contact lens of the 12th example.

Please refer to Table 35 and FIG. 20 simultaneously, radiuses and the correspondent diopters of the multifocal contact lens of the 12th example are listed in Table 35. FIG. 20 shows a relationship between the radius and the diopter of the multifocal contact lens of the 12th example (the negative radius having an opposite direction with the positive radius). As shown in Table 35 and FIG. 20, the diopter of the central region is fixed, the diopter of the third annular region is different from the diopter of the central region, the diopter of the second annular region is different from the diopter of the central region, and the diopter of the first annular region is different from the diopter of the central region. Specifically, the diopter of the third annular region is greater than the diopter of the central region, the diopter of the third annular region increases when away from the central region, the diopter of the second annular region is greater than the diopter of the central region, the diopter of the second annular region increases when away from the central region, the diopter of the first annular region is greater than the diopter of the central region, and the diopter of the first annular region is fixed.

TABLE 35

| 12th example | | | |
|---|---|---|---|
| radius (mm) | diopter (D) | radius (mm) | diopter (D) |
| −8.00 | −3.00 | 0.50 | −5.50 |
| −7.50 | −3.00 | 1.00 | −5.50 |
| −7.00 | −3.00 | 1.50 | −5.50 |
| −6.50 | −3.00 | 2.00 | −5.50 |
| −6.00 | −3.00 | 2.50 | −5.06 |
| −5.50 | −3.19 | 3.00 | −4.63 |
| −5.00 | −3.38 | 3.50 | −4.19 |
| −4.50 | −3.56 | 4.00 | −3.75 |
| −4.00 | −3.75 | 4.50 | −3.56 |
| −3.50 | −4.19 | 5.00 | −3.38 |
| −3.00 | −4.63 | 5.50 | −3.19 |
| −2.50 | −5.06 | 6.00 | −3.00 |
| −2.00 | −5.50 | 6.50 | −3.00 |
| −1.50 | −5.50 | 7.00 | −3.00 |
| −1.00 | −5.50 | 7.50 | −3.00 |
| −0.50 | −5.50 | 8.00 | −3.00 |
| 0.00 | −5.50 | | |

In the 12th example, the multifocal contact lens is made of silicone hydrogel. A composition for manufacturing the silicone hydrogel of the 12th example is listed in Table 36A.

TABLE 36A

| Ingredient | Content (wt %) |
|---|---|
| 2-hydroxyethyl methacrylate | 4.2 |
| 3-methacryloyloxypropyltris(trimethylsilyloxy)silane | 26 |
| 2-hydroxy-2-methyl-propiophenone | 0.6 |
| N-vinyl-2-pyrrolidinone | 20 |
| N,N-dimethyl acrylamide | 11 |
| polysiloxane macromer | 24 |
| 4-(phenyldiazenyl) phenyl methacrylate | 1 |
| methyl methacrylate | 4.2 |
| ethanol | 9 |

As shown in Table 36A, the multifocal contact lens of the 12th example can effectively block the blue lights by adding 4-(phenyldiazenyl) phenyl methacrylate.

Figure 21:
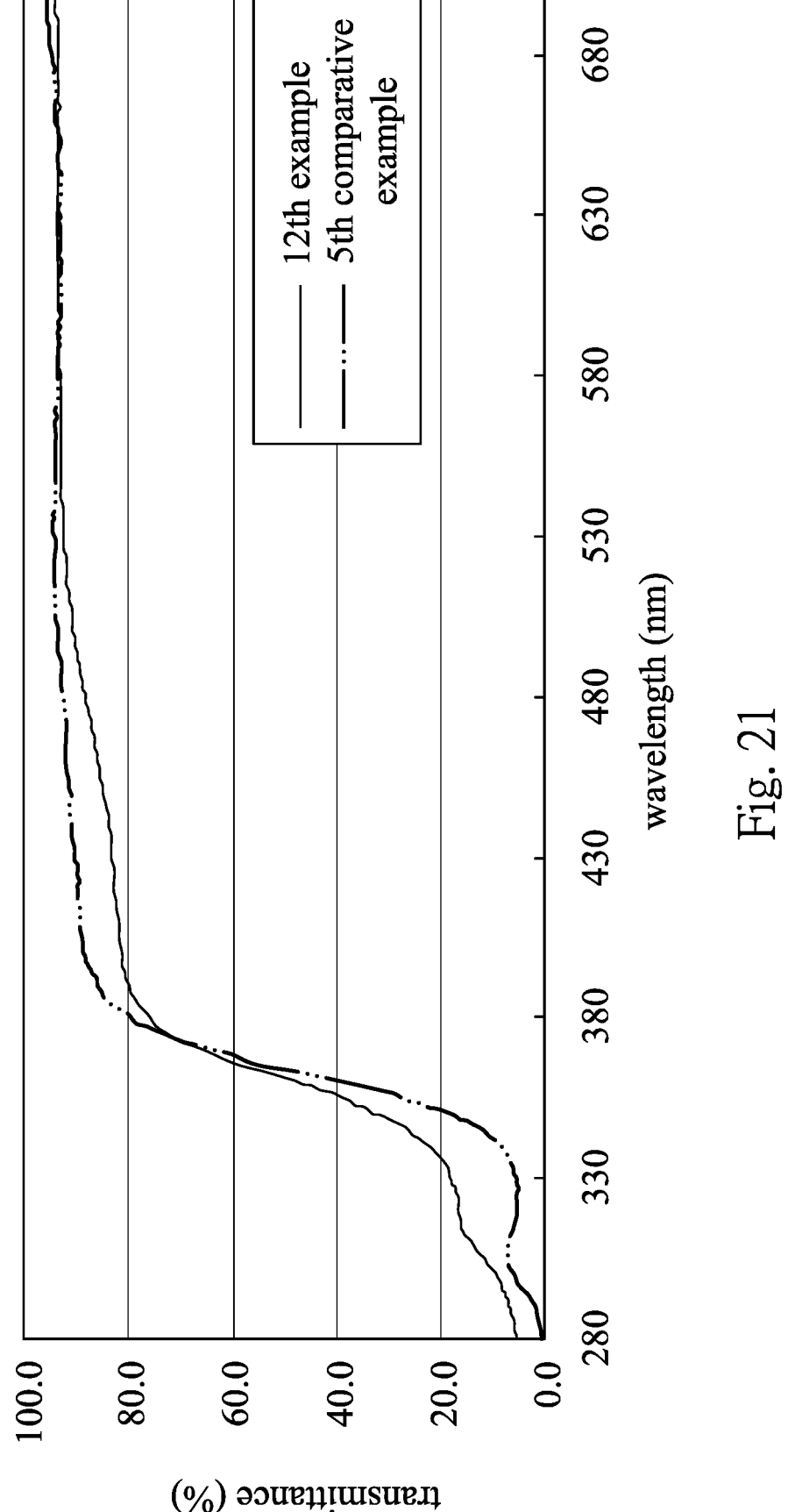
FIG. 21 shows a relationship between a wavelength and a transmittance of the multifocal contact lens of the 12th example and a multifocal contact lens of the 5th comparative example.

FIG. 21 shows a relationship between a wavelength and a transmittance of the multifocal contact lens of the 12th example and a multifocal contact lens the 5th comparative example. The difference between the 5th comparative example and the 12th example is the 5th comparative example in lack of blue-light blocking agent. Specifically, a composition of the 5th comparative example is formulated by replacing the the 4-(phenyldiazenyl) phenyl methacrylate in the 12th example with the 2-hydroxyethyl methacrylate. In FIG. 21, a blocking rate for blue lights (with a wavelength ranging from 380 nm to 495 nm) of the 5th comparative example and the 12th example can be calculated by the following formula: (1−an average transmittance of the wavelength ranging from 380 nm to 495 nm)×100%. The calculated results are listed in Table 36B.

TABLE 36B

| | 5th comparative example | 12th example |
|---|---|---|
| blocking rate for blue lights (%) (380 nm-495 nm) | 10.31 | 16.32 |

As shown in Table 36B, comparing to the 5th comparative example, the blocking rate for blue lights of the 12th example is much greater than that of the 5th comparative example. In other words, the multifocal contact lens of the 12th example can effectively block the blue lights, so that the probability that the retina hurt by the blue lights can be reduced.

According to the multifocal contact lens of the present disclosure, a aspheric surface refers to a curved shape of a front surface or a back surface shown in a cross-sectional view taken along the central line of the multifocal contact lens. The front surface is a surface of the multifocal contact lens far away from the cornea, and the back surface is a surface of the multifocal contact lens close to the cornea.

According to the multifocal contact lens of the present disclosure, the diopter is represented by D. When the multifocal contact lens is for correcting myopia, the diopter thereof is negative, when the multifocal contact lens is for correcting hyperopia, the diopter thereof is positive.

According to the present disclosure, the cycloplegic agent can include but is not limited to atropine ((3-endo)-8-methyl-8-azabicyclo[3.2.1]oct-3-yl tropate), tropicamide (N-ethyl-3-hydroxy-2-phenyl-N-(4-pyridinylmethyl)pro-panamide), cyclopentolate (2-(dimethylamino)ethyl (1-hy-droxycyclopentyl)(phenyl)acetate), homatropine ((3-endo)-8-methyl-8-azabicyclo[3.2.1]oct-3-yl hydroxy(phenyl)acetate), scopolamine ((1R,2R,4S,5S,7S)-9-methyl-3-oxa-9-azatricyclo[3.3.1.0$^{2,4}$]non-7-yl(2S)-3-hydro xy-2-phenylpropanoate), eucatropine (1,2,2,6-tetramethyl-4-piperidinyl hydroxy(phenyl)acetate) or the salt thereof. The cycloplegic agent, also known as a mydriatic agent, belongs to a parasympathetic blocker, i.e., a non-selective m-type muscarinic receptor blocker, which can control the paralysis and relaxation of the ciliary muscle of pupils by blocking the muscarinic receptor so as to enlarge the pupil.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A contact lens product, comprising:
a multifocal contact lens made of a silicone hydrogel, comprising:
a central region; and
at least one annular region concentrically surrounding the central region, wherein a diopter of the annular region is different from a diopter of the central region, and the annular region closest to a periphery of the multifocal contact lens is a first annular region; and
a buffer solution, wherein the multifocal contact lens is immersed in the buffer solution, and the buffer solution comprises a cycloplegic agent;
wherein a composition for manufacturing the silicone hydrogel comprises 2-hydroxyethyl methacrylate and 3-methacryloyloxypropyltris(trimethylsilyloxy)silane;
wherein a weight percentage concentration of the 2-hy-droxyethyl methacrylate in the composition for manu-facturing the silicone hydrogel is 0.05% to 25%, and a weight percentage concentration of the 3-methacryloy-loxypropyltris(trimethylsilyloxy)silane in the composi-tion for manufacturing the silicone hydrogel is 0.1% to 40%;
wherein a weight percentage concentration of the cycloplegic agent in the buffer solution is ConA, the diopter of the central region of the multifocal contact lens is PowC, a maximum diopter of the first annular region of the multifocal contact lens is PowP1, a diameter of the central region of the multifocal contact lens is DiC, an outer diameter of the first annular region of the multifocal contact lens is DiP1, and the following conditions are satisfied:

ConA<0.5%;

2.25 D≤|PowC−PowP1|;

−5.50 D≤PowP1≤−0.50 D;

2 mm<DiC; and 0.15≤DiC/DiP1≤0.64.

2. The contact lens product of claim 1, wherein the weight percentage concentration of the cycloplegic agent in the buffer solution is ConA, and the following condition is satisfied:

0.01%<ConA<0.5%.

3. The contact lens product of claim 2, wherein the diopter of the central region of the multifocal contact lens is PowC, the maximum diopter of the first annular region of the multifocal contact lens is PowP1, and the following condi-tion is satisfied:

2.50 D≤|PowC−PowP1|.

4. The contact lens product of claim 1, wherein the diameter of the central region of the multifocal contact lens is DiC, and the following condition is satisfied:

2 mm<DiC≤6 mm.

5. The contact lens product of claim 4, wherein the diameter of the central region of the multifocal contact lens is DiC, the outer diameter of the first annular region of the multifocal contact lens is DiP1, and the following condition is satisfied:

0.25≤DiC/DiP1≤0.53.

6. The contact lens product of claim 1, wherein the diopter of the central region of the multifocal contact lens is PowC, and the following condition is satisfied:

−5.00 D≤PowC≤−0.25 D.

7. The contact lens product of claim 6, wherein the diopter of the central region of the multifocal contact lens is PowC, and the following condition is satisfied:

−3.00 D≤PowC≤−1.00 D.

8. The contact lens product of claim 1, wherein a com-position for manufacturing the multifocal contact lens com-prises a blue-light blocking agent.

9. The contact lens product of claim 1, wherein a com-position for manufacturing the multifocal contact lens com-prises a UV (Ultraviolet) blocking agent.

10. The contact lens product of claim 1, wherein the weight percentage concentration of the 2-hydroxyethyl methacrylate in the composition for manufacturing the sili-cone hydrogel is 0.1% to 10%.

11. The contact lens product of claim 1, wherein the weight percentage concentration of the 3-methacryloyloxy-propyltris(trimethylsilyloxy)silane in the composition for manufacturing the silicone hydrogel is 1% to 40%.

* * * * *